(12) United States Patent
Moeglein et al.

(10) Patent No.: US 9,400,930 B2
(45) Date of Patent: Jul. 26, 2016

(54) HYBRID PHOTO NAVIGATION AND MAPPING

(71) Applicant: QUALCOMM Incorporated, San Diego, CA (US)

(72) Inventors: Mark Leo Moeglein, Ashland, OR (US); Christopher Brunner, San Diego, CA (US); Hui Chao, San Jose, CA (US); Murali Ramaswamy Chari, San Diego, CA (US); Arvind Ramanandan, San Diego, CA (US); Mahesh Ramachandran, San Jose, CA (US); Abhishek Tyagi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/497,219

(22) Filed: Sep. 25, 2014

(65) Prior Publication Data

US 2015/0094089 A1 Apr. 2, 2015

Related U.S. Application Data

(60) Provisional application No. 61/883,921, filed on Sep. 27, 2013.

(51) Int. Cl.
*H04W 4/02* (2009.01)
*H04W 4/04* (2009.01)
(Continued)

(52) U.S. Cl.
CPC ............ *G06K 9/00671* (2013.01); *G01C 21/00* (2013.01); *G01C 21/165* (2013.01);
(Continued)

(58) Field of Classification Search
CPC ......... H04W 4/02; H04W 4/04; H04W 4/028; H04W 4/043
USPC ........... 455/456.1, 456.2, 456.3, 456.5, 456.6
See application file for complete search history.

(56) References Cited

U.S. PATENT DOCUMENTS 7,848,881 B2 12/2010 Tan et al.
8,320,939 B1 11/2012 Vincent
(Continued)

FOREIGN PATENT DOCUMENTS

WO 0034803 A2 6/2000
WO 2008024772 A1 2/2008
(Continued)

OTHER PUBLICATIONS

International Search Report and Written Opinion—PCT/US2014/057702—ISA/EPO—Feb. 19, 2015.
(Continued)

*Primary Examiner* — Christopher M Brandt
(74) *Attorney, Agent, or Firm* — Silicon Valley Patent Group LLP

(57) ABSTRACT

Embodiments disclosed obtain a plurality of measurement sets from a plurality of sensors in conjunction with the capture of a sequence of exterior and interior images of a structure while traversing locations in and around the structure. Each measurement set may be associated with at least one image. An external structural envelope of the structure is determined from exterior images of the structure and the corresponding outdoor trajectory of a UE. The position and orientation of the structure and the structural envelope is determined in absolute coordinates. Further, an indoor map of the structure in absolute coordinates may be obtained based on interior images of the structure, a structural envelope in absolute coordinates, and measurements associated with the indoor trajectory of the UE during traversal of the indoor area to capture the interior images.

30 Claims, 19 Drawing Sheets

(51) Int. Cl.

| | | |
|---|---|---|
| *G06K 9/00* | (2006.01) | |
| *G06T 7/60* | (2006.01) | |
| *G01C 21/00* | (2006.01) | |
| *G01S 19/13* | (2010.01) | |
| *G06T 7/20* | (2006.01) | |
| *G01C 21/20* | (2006.01) | |
| *G06T 7/00* | (2006.01) | |
| *G01C 21/16* | (2006.01) | |
| *G01C 25/00* | (2006.01) | |
| *G01S 5/02* | (2010.01) | |
| *G01S 5/16* | (2006.01) | |

(52) U.S. Cl.
CPC ............ *G01C 21/20* (2013.01); *G01C 21/206* (2013.01); *G01C 25/005* (2013.01); *G01S 19/13* (2013.01); *G06T 7/0018* (2013.01); *G06T 7/2046* (2013.01); *G06T 7/60* (2013.01); *H04W 4/028* (2013.01); *H04W 4/043* (2013.01); *G01S 5/0263* (2013.01); *G01S 5/0294* (2013.01); *G01S 5/16* (2013.01); *G01S 5/163* (2013.01); *G06T 2207/10004* (2013.01); *G06T 2207/10016* (2013.01); *G06T 2207/30212* (2013.01); *G06T 2207/30244* (2013.01); *G06T 2207/30252* (2013.01); *H04M 2250/12* (2013.01); *H04M 2250/52* (2013.01)

(56) References Cited

U.S. PATENT DOCUMENTS

| | | |
|---|---|---|
| 8,510,041 B1 | 8/2013 | Anguelov et al. |
| 8,532,885 B1 | 9/2013 | Whitehead |
| 8,626,198 B2 | 1/2014 | Das et al. |
| 9,148,764 B2 | 9/2015 | Das et al. |
| 2004/0001647 A1 | 1/2004 | Lake et al. |
| 2004/0168148 A1 | 8/2004 | Goncalves et al. |
| 2007/0021126 A1 | 1/2007 | Nanda et al. |
| 2007/0224977 A1 | 9/2007 | Yamaguchi et al. |
| 2007/0276590 A1 | 11/2007 | Leonard et al. |
| 2008/0223131 A1* | 9/2008 | Vannucci et al. ............... 73/510 |
| 2009/0248304 A1 | 10/2009 | Roumeliotis et al. |
| 2010/0008337 A1 | 1/2010 | Bajko |
| 2010/0125409 A1 | 5/2010 | Prehofer |
| 2010/0178934 A1 | 7/2010 | Moeglein et al. |
| 2010/0255856 A1 | 10/2010 | Kansal et al. |
| 2011/0025555 A1 | 2/2011 | Whitehead |
| 2011/0081918 A1 | 4/2011 | Burdo et al. |
| 2011/0172906 A1 | 7/2011 | Das et al. |
| 2011/0178708 A1 | 7/2011 | Zhang et al. |
| 2011/0249152 A1 | 10/2011 | Lindsay et al. |
| 2012/0021762 A1 | 1/2012 | Garin et al. |
| 2012/0121161 A1 | 5/2012 | Eade et al. |
| 2012/0130762 A1 | 5/2012 | Gale et al. |
| 2012/0190379 A1 | 7/2012 | Hassan et al. |
| 2012/0303255 A1 | 11/2012 | Wong et al. |
| 2013/0083964 A1 | 4/2013 | Morris et al. |
| 2013/0093852 A1 | 4/2013 | Ye |
| 2013/0100282 A1 | 4/2013 | Siercks |
| 2013/0138247 A1 | 5/2013 | Gutmann et al. |
| 2013/0182891 A1 | 7/2013 | Ling |
| 2013/0201365 A1 | 8/2013 | Wirola et al. |
| 2013/0202197 A1 | 8/2013 | Reeler et al. |
| 2013/0222369 A1 | 8/2013 | Huston et al. |
| 2013/0244693 A1 | 9/2013 | Das et al. |
| 2013/0342391 A1 | 12/2013 | Hoang et al. |
| 2014/0126769 A1 | 5/2014 | Reitmayr et al. |
| 2015/0092048 A1 | 4/2015 | Brunner |
| 2015/0094952 A1 | 4/2015 | Moeglein |

FOREIGN PATENT DOCUMENTS

| | | |
|---|---|---|
| WO | 2013040411 A1 | 3/2013 |
| WO | 2013108243 A1 | 7/2013 |

OTHER PUBLICATIONS

Jones E.S., et al., "Visual-Inertial Navigation, Mapping and Localization: A Scalable Real-Time Causal Approach," International Journal of Robotics Research, Sep. 23, 2010, pp. 1-38.

* cited by examiner

|  | Outdoor Availability | Indoor Availability | Precision | Global Availability | Power Consumption |
|---|---|---|---|---|---|
| Satellite | Excellent | Fair | Good | Excellent | Fair |
| Inertial | Excellent | Excellent | Good | N/A | Fair |
| Photo | Fair | Good | Excellent | N/A | Fair |
| WAN | Good | Good | Fair | Good | Good |
| LAN/Beacons | Fair | Good | Good | Good | Fair |

FIG. 3A

|  | Outdoor Ambiguity | Outdoor Precision | Line Sighting | Signal Strength | Indoor Ambiguity | Indoor Precision |
|---|---|---|---|---|---|---|
| Satellite | Low | High | LOS | Weak | Low | Medium |
| Inertial | N/A | Medium | Excellent | N/A | N/A | Medium |
| Photo | High | High | Good | N/A | High | High |
| WAN | Low | Medium | Fair | Strong | Low | Medium |
| LAN/Beacons | Low | Medium | Fair | Varies | Low | Medium |

FIG. 3B

HYBRID PHOTO NAVIGATION AND MAPPING

CROSS REFERENCE TO RELATED APPLICATIONS

This application claims the benefit of and priority to U.S. Provisional Application No. 61/883,921 entitled "Off-Target Tracking Using Feature Aiding in the Context of Inertial Navigation," filed Sep. 27, 2013, which is incorporated by reference in its entirety herein.

FIELD

The subject matter disclosed herein relates generally to terrestrial positioning systems, and in particular, to systems and methods for hybrid photo navigation and mapping.

BACKGROUND

It is often desirable to know the location of a terminal such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

One method of determining the location of User Equipment (UE) such as a mobile device is based on measurements of the times of signal arrival from multiple antennas. For example, a UE may measure time differences in received signals from a plurality of base station antennas. Because positions of the base station antennas are known, the observed time differences may be used to calculate the location of the terminal.

A UE may make use of a Base Station Almanac (BSA) to perform measurement calculations and/or may send the measurements to a location server for position calculation. The term Advanced Forward Link Trilateration (AFLT) is used to describe terrestrial positioning in Code Division Multiple Access (CDMA) systems, while the term Observed Time Difference of Arrival (OTDOA) is used in the context of Wideband CDMA (WCDMA) and Long Term Evolution (LTE) systems.

However, current position location solutions are focused on outdoor mapping/navigation where measurements of Global Navigation Satellite Systems (GNSS) and/or terrestrial cellular (AFLT/OTDOA/Reference Signal Time Difference (RSTD)) may be used to determine the position of a UE. In contrast, for indoor locations, where access to SPS/terrestrial signals may be non-existent, limited and/or affected by multipath, no easily deployable cost effective positioning/navigation systems exist. Moreover, the acquisition and maintenance of indoor maps to aid indoor navigation on a large scale has been viewed as cost-prohibitive.

The use of indoor maps as navigation aids is facilitated both by accuracy and seamless transitions from outdoor to indoor maps. For example, the ability to localize a UE within a room in a building while also providing an exterior context (such as indicating the room and/or building location relative an outdoor a larger area map) may be helpful for user orientation and when providing navigational assistance. Typically, current SPS/wireless navigational systems, even if available, do not provide adequate accuracy for an indoor mapping/navigation solution.

Therefore, there is a need for coherent strategies to cost-effectively acquire and maintain maps, including indoor maps, in part, to support deployment of a network wide indoor navigation system.

SUMMARY

In some embodiments, a method on a user equipment (UE) may comprise: capturing a plurality of images of the interior of a structure when traversing a plurality of locations within the structure; capturing a plurality of measurement sets, wherein each measurement set corresponds to at least one image, and each measurement set comprises at least one of Inertial Measurement Unit (IMU) measurements or available wireless measurements; and estimating a trajectory of the UE based, in part, on the captured images and the plurality of measurement sets. In some embodiments, the estimated trajectory, captured images and corresponding measurement sets may be sent to a server wirelessly coupled to the UE; and an indoor map of the structure, receiving, based on the estimated trajectory, captured images and corresponding measurement sets, may be received from the server, wherein the indoor map is registered to absolute coordinates and comprises information pertaining to a corrected trajectory of the UE.

In another aspect, a User Equipment (UE) may comprise: a camera configured to capture a plurality of images of the interior of a structure when traversing a plurality of locations within the structure; a plurality of sensors, the sensors comprising an Inertial Measurement Unit (IMU), a wireless module configured to take measurements of available wireless signals, and a processor, coupled to the camera, sensors and wireless module. In some embodiments, the processor may be configured to: obtain the plurality of images of the interior of a structure, obtain a plurality of measurement sets, wherein each measurement set corresponds to at least one image in the plurality of images, and each measurement set comprises at least one of IMU measurements and available wireless measurements; estimate a trajectory of the UE based, in part, on the captured images and the plurality of measurement sets, send the estimated trajectory, captured images and corresponding measurement sets to a server wirelessly coupled to the UE; and receive, based on the estimated trajectory, captured images and corresponding measurement sets, an indoor map of the structure from the server, wherein the indoor map is registered to absolute coordinates and comprises information pertaining to a corrected trajectory of the UE.

In a further aspect, a User Equipment (UE) may comprise: imaging means configured to capture a plurality of images of the interior of a structure when traversing a plurality of locations within the structure; sensing means, the sensing means comprising an Inertial Measurement Unit (IMU), wireless measurement means configured to take measurements of available wireless signals, means for obtaining the plurality of images of the interior of a structure, means for obtaining a plurality of measurement sets, wherein each measurement set corresponds to at least one image in the plurality of images, and each measurement set comprises at least one of IMU measurements and available wireless measurements; means for estimating a trajectory of the UE based, in part, on the captured images and the plurality of measurement sets, means for sending the estimated trajectory, captured images and corresponding measurement sets to a server wirelessly coupled to the UE; and means for receiving, based on the estimated trajectory, captured images and corresponding measurement sets, an indoor map of the structure from the server, wherein the indoor map is registered to absolute coordinates and comprises information pertaining to a corrected trajectory of the UE.

Disclosed embodiments also pertain to a non-transitory computer-readable medium comprising instructions, which, when executed by a processor, cause the processor to be configured to: capture a plurality of images of the interior of a structure when traversing a plurality of locations within the structure; capture a plurality of measurement sets, wherein each measurement set corresponds to at least one image, and each measurement set comprises at least one of Inertial Measurement Unit (IMU) measurements or available wireless measurements; estimate a trajectory of the UE based, in part, on the captured images and the plurality of measurement sets; send the estimated trajectory, captured images and corresponding measurement sets to a server wirelessly coupled to the UE; and receive, based on the estimated trajectory, captured images and corresponding measurement sets, an indoor map of the structure from the server, wherein the indoor map is registered to absolute coordinates and comprises information pertaining to a corrected trajectory of the UE.

The methods disclosed may be performed by one or more of servers (including location servers), mobile stations, etc. using LPP, LPPe or other protocols. Embodiments disclosed also relate to software, firmware, and program instructions created, stored, accessed, read or modified by processors using non transitory computer readable media or computer readable memory.

BRIEF DESCRIPTION OF THE DRAWINGS

FIGS. 3A and 3B show tables indicating the availability of different positioning techniques in a variety of situations along with associated location precision, positioning ambiguity, and power consumption.

DETAILED DESCRIPTION

The terms "user device" (UD) or "user equipment" (UE) or are used interchangeably herein and may refer to a device such as a cellular or other wireless communication device, personal communication system (PCS) device, personal navigation device (PND), Personal Information Manager (PIM), Personal Digital Assistant (PDA), laptop, or other suitable mobile device which is capable of receiving wireless communication and/or navigation signals. The terms are also intended to include devices which communicate with a personal navigation device (PND), such as by short-range wireless, infrared, wireline connection, or other connection —regardless of whether satellite signal reception, assistance data reception, and/or position-related processing occurs at the device or at the PND. The UE may represent a mobile telephone, notepad computer or laptop, or it may be a vehicle that collects said measurement sets for the purpose of creating street maps and/or the delay and/or signal strength maps herein.

In addition, the terms UE, UD, "mobile station," or "mobile device" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network. Any operable combination of the above are also considered a user device.

Figure 1A:
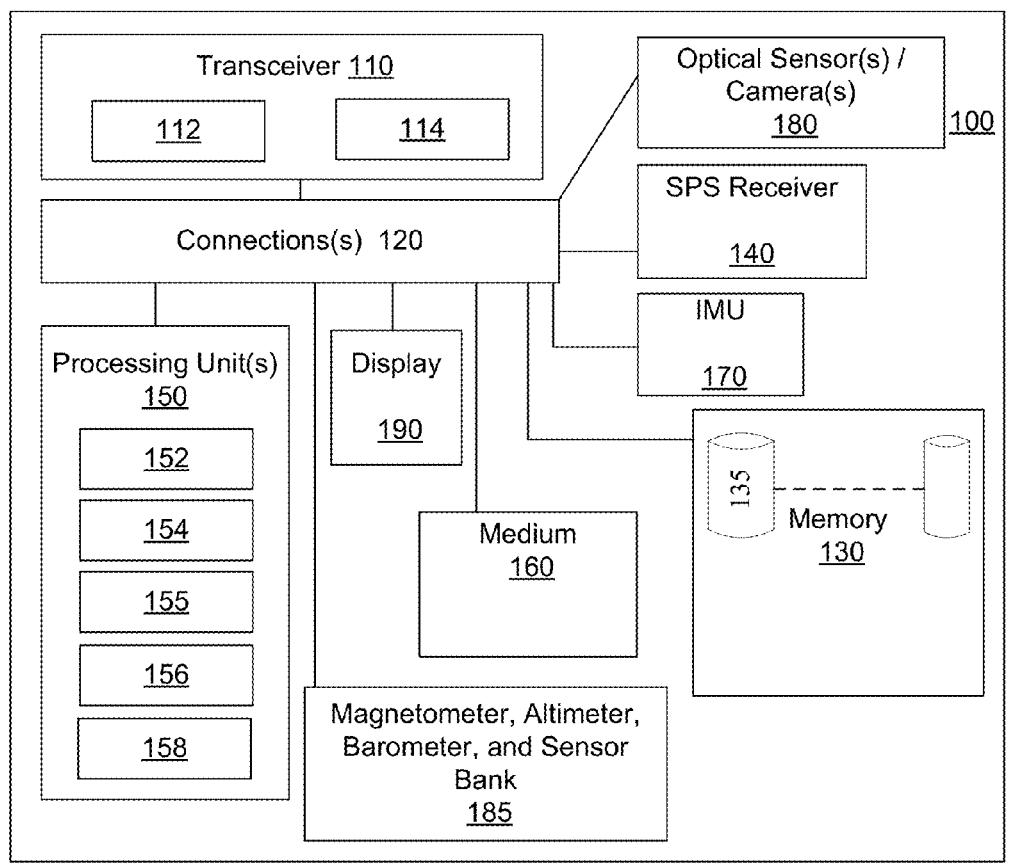
FIG. 1A shows a schematic block diagram illustrating certain exemplary features of a UE enabled to support hybrid photo navigation and mapping in a manner consistent with disclosed embodiments.

FIG. 1A shows a schematic block diagram illustrating certain exemplary features of UE 100 enabled to support mapping based on a combination of wireless signal and sensor based measurements, including camera or other image based techniques. Further, in some embodiments, UE 100 may also support hybrid photo navigation by combining image based techniques with wireless signal and sensor based techniques. The term "hybrid" is used to refer to the use of a combination of one or more of sensor based, image based, and/or wireless signal based techniques to perform mapping and navigation in a manner consistent with embodiments disclosed herein. In some embodiments, UE 100 may support hybrid photo mapping. In some embodiments UE 100 may further support hybrid photo navigation and location determination.

MS 100 may, for example, include one or more processing units or processing unit(s) 150, memory 130, a transceiver 110 (e.g., wireless network interface), and (as applicable) GNSS or Satellite Positioning System (SPS) receiver 140, optical sensors/camera(s) 180, magnetometer, altimeter, barometer and sensor bank 185 (collectively referred to as sensors 185), Inertial Measurement Unit (IMU) 170, non-transitory computer-readable medium 160, display 190, and memory 130, which may be operatively coupled to each other with one or more connections 120 (e.g., buses, lines, fibers, links, etc.). In certain example implementations, all or part of UE 100 may take the form of a chipset, and/or the like. The magnetometer may be capable of measuring the intensity and/or the direction of the Earth's magnetic field and may serve as a compass and/or provide an indication of a direction of travel of UE 100. The altimeter may be used to provide an indication of altitude above a calibrated level, while the barometer may provide an indication of atmospheric pressure, which may be used to obtain a determination of altitude.

GNSS/SPS receiver 140 may be enabled to receive signals associated with one or more SPS resources. Received GNSS/SPS signals may be used to determine a position of UE 100. Transceiver 110 may, for example, include a transmitter 112 enabled to transmit one or more signals over one or more types of wireless communication networks and a receiver 114 to receive one or more signals transmitted over one or more types of wireless communication networks.

Figure 1B:
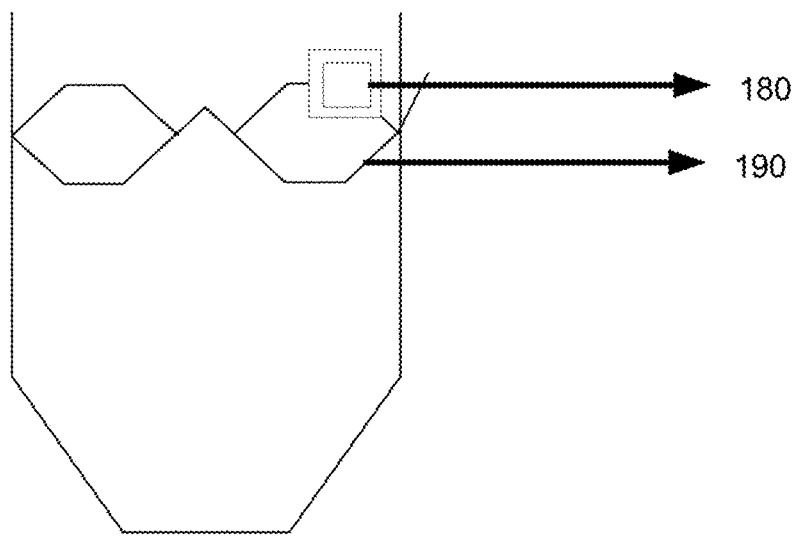
FIG. 1B shows an exemplary wearable user device.

In some embodiments, UE 100 may comprise image sensors such as CCD or CMOS sensors and/or camera(s) 180, which are hereinafter referred to as "camera(s) 180". Camera(s) 180 may convert an optical image into an electronic or digital image and may send captured images to processing unit(s) 150. For example, as shown in FIG. 1B, in some embodiments, camera(s) 180 may be housed in a wearable mobile device, and may be operationally coupled to display 190, processing unit(s) 150 and/or other functional units in UE 100.

In some embodiments, processing unit(s) 150 may also receive input from one or more sensors 185, which may include a variety of sensors 185, such as a magnetometer, altimeter and/or barometer. In addition, sensors 185 may include one or more of an ambient light sensor, acoustic transducers such as microphones/speakers, ultrasonic transducers and/or depth sensors, which may be used to acquire depth information and/or determine distance to a target. In general, the list of sensors above in not exhaustive and sensor bank 185 may include various other types of sensors and transducers which are increasingly being incorporated into modern smartphones and other mobile devices.

In some embodiments, UE 100 may also include Inertial Measurement Unit (IMU) 170. In some embodiments, IMU 170, which may comprise 3 axis accelerometer(s), 3-axis gyroscope(s), and/or magnetometer(s), may provide velocity, orientation, and/or other position related information to processing unit(s) 150. In some embodiments, IMU 170 may be configured to measure and output measured information synchronized to the capture of each image frame by camera(s) 180, and/or measurements taken by sensors 185 in UE 100. In some embodiments, the output of IMU 170 may be used by processing unit(s) 150 to determine a position and orientation UE 100.

The term "wireless measurements" is used herein to refer to measurements of SPS, cellular, WLAN, WPAN, and other radio signals. The term "non-wireless measurements" refer to sensor measurements including (but not limited to) IMU, barometer, altimeter, and magnetometer measurements. In some embodiments, the capture of wireless measurements by a UE may be synchronized with the capture of non-wireless measurements. Further, the capture of wireless and/or non-wireless measurements can be synchronized with the capture of images by the UE. For example, measurements (wireless and/or non-wireless) and captured images may be timestamped and the measurements and images may be associated with each other based on the time stamps. The association of measurements with image and/or with each other may occur concurrently with measurement/image recordation, and/or at a later point in time based on the timestamps associated with the measurements.

The term "measurement set" is used to refer to signal measurements performed by a UE at a measurement location at a point in time or within some specified interval of a point in time. The signal measurements made may be related to mapping and/or position determination. The signal measurements made may also depend on UE 100, the capabilities of UE 100, environmental characteristics and/or signal characteristics that are available for measurement by UE 100 at a specific location/time. Typically, a measurement set may comprise image(s), wireless measurements and non-wireless measurements, where each element of the measurement set may have been recorded within some specified time interval of a point in time. The measurement sets recorded by UE 100 may be stored in memory 130 on UE 100 and/or sent to a server, where they may be processed and/or aggregated with other measurements related to that measurement location. For example, the measurement sets may stored in a Base Station Almanac (BSA) and/or used for mapping/location determination.

Processing unit(s) 150 may be implemented using a combination of hardware, firmware, and software. In some embodiments, processing unit(s) 150 may include Mapping Module (MM) 152, Navigation Module (NM) 154, and Location Assistance Data Module (LADM) 158. In some embodiments, LADM 158 may process received location assistance data. Location assistance data may take the form of layered map information such as multipath and visibility map assistance information, Observed Time Difference of Arrival (OT-DOA) assistance information, including PRS assistance information, etc. In some embodiments, processing unit(s) 150 may also include Computer Vision Module (CVM) 155, which may implement a variety of image processing and CV functions.

The term "map layer" as used herein in refers to information, such as location assistance information, tailored to a position and position uncertainty of a UE. Each layer of the map may comprise information about a parameter, wherein the information is provided in relation to absolute or global coordinates common to the layers. In general, map layers may comprise various types of information. For example, map layers may comprise one or more of: a received signal strength map layer that correlates a received signal strength with map locations; a Signal to Noise Ratio (SNR) map layer correlating SNRs with map locations; a Forward Link Calibration (FLC) layer that correlates FLC information with map locations; etc.

In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processing unit(s) 150. In some embodiments, camera(s) 180 may be a wearable camera, or an external camera, which may be operationally coupled to, but housed separately from, other functional units in UE 100. In one embodiment, images captured by camera(s) 180 may be in a raw uncompressed format and may be compressed prior to being processed and/or stored in memory 160. In some embodiments, image compression may be performed by processing unit(s) 150 (e.g. by CVM 155) using lossless or lossy compression techniques.

In some embodiments, camera 180 may be a depth sensing camera or may be coupled to depth sensors. The term "depth sensor" is used to refer to functional units that may be used to obtain depth information for an environment independently and/or in conjunction with camera(s) 180. In some embodiments, may comprise RGBD cameras, which may capture per-pixel depth (D) information when the depth sensor is enabled, in addition to color (RGB) images. As another example, in some embodiments, camera 110 may take the form of a 3D Time Of Flight (3DTOF) camera. In embodiments with 3DTOF cameras 110, the depth sensor may take the form of a strobe light coupled to the 3DTOF camera 110, which may illuminate objects in a scene and reflected light may be captured by a CCD/CMOS sensor in camera 110. Depth information may be obtained by measuring the time that the light pulses take to travel to the objects and back to the sensor.

As a further example, the depth sensor may take the form of a light source coupled to cameras 110. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera. In some embodiments, camera(s) 180 may be stereoscopic cameras capable of capturing 3 Dimensional (3D) images. In another embodiment, camera(s) 180 may include depth sensors that are capable of estimating depth information. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information. In some embodiments, depth sensors may be disabled, when not in use. For example, the depth sensor may be placed in a standby mode, or powered off when not being used. In some embodiments, processors 150 may disable (or enable) depth sensing at one or more points in time.

Processing unit(s) 150 may also execute software to process image frames captured by camera(s) 180. For example, processing unit(s) 150 may be capable of processing one or more image frames received from camera(s) 180 to determine the pose of camera(s) 180, implementing various computer vision and image processing algorithms and/or performing 3D reconstruction of an environment corresponding to an image received from camera(s) 180. The pose of camera(s) 180 refers to the position and orientation of the camera(s) 180 relative to a frame of reference. In some embodiments, camera pose may be determined for 6-Degrees Of Freedom (6-DOF), which refers to three translation components (which may be given by X,Y,Z coordinates of a frame of reference) and three angular components (e.g. roll, pitch and yaw relative to the same frame of reference).

In some embodiments, the pose of camera(s) 180 and/or UE 100 may be determined and/or tracked by processing unit(s) 150 using a visual tracking solution based on image frames captured by camera(s) 180. In some embodiments, CVM 155 may be implemented using dedicated circuitry, such as Application Specific Integrated Circuits (ASICs), Digital Signal Processors (DSPs), and/or dedicated processor (such as processing unit(s) 150). In some embodiments, CVM 155 may include functionality to communicate with one or more other processors on UE 100.

In some embodiments, CVM 155 may implement various computer vision and/or image processing methods such as 3D reconstruction, image compression and filtering. CVM 155 may also implement computer vision based tracking, model-based tracking, Simultaneous Localization And Mapping (SLAM), etc. In some embodiments, the methods implemented by CVM 155 may be based on color or grayscale image data captured by camera(s) 180, which may be used to generate estimates of 6-DOF pose measurements of the camera.

SLAM refers to a class of techniques where a map of an environment, such as a map of an environment being modeled by UE 100, is created while simultaneously tracking the pose of UE 100 relative to that map. SLAM techniques include Visual SLAM (VLSAM), where images captured by a camera, such as camera(s) 180 on UE 100, may be used to create a map of an environment while simultaneously tracking the camera's pose relative to that map. VSLAM may thus involve tracking the 6DOF pose of a camera while also determining the 3-D structure of the surrounding environment. For example, in some embodiment, VSLAM techniques may detect salient feature patches or keypoints in one or more captured image frames and store the captured imaged frames as keyframes or reference frames. In keyframe based SLAM, the pose of the camera may then be determined, for example, by comparing a currently captured image frame with one or more previously captured and/or stored keyframes.

In some embodiments, CVM 155 may comprise 3D reconstruction module, which may use the camera pose and per-pixel map information to create a 3D model or representation of the environment. In some embodiments, 3D reconstruction module may be implemented using dedicated circuitry, such as Application Specific Integrated Circuits (ASICs), Digital Signal Processors (DSPs), and/or dedicated processor (such as processing unit(s) 150). 3D reconstruction module may use a set of 3D points in a point cloud, which may be determined from images of a structure, to obtain a 3D model of the structure.

In one embodiment, processing unit(s) 150 may track the position of camera(s) 180 by using monocular VSLAM techniques to build a coarse map of the environment around UE 100 for accurate and robust 6DOF tracking of camera(s) 180. The term monocular refers to the use of a single non stereoscopic camera to capture images or to images captured without depth information.

Tracking UE and/or camera pose, in a spatial coordinate system can be accomplished in a variety of ways. Where Satellite Positioning System (SPS) signals are unavailable or unreliable, such as in indoor environments, such tracking can be done using a combination of visual and inertial tracking systems. For example, images captured by camera(s) 180 may be used in conjunction with measurements by IMU 170 and/or sensors in sensor bank 185 (e.g. altimeter, barometer, magnetometer etc.) to determine the pose of UE 100 and/or camera(s) 180. In some embodiments, VSLAM based techniques may be used, in part, to correct for errors (such as biases and drift) in IMU 170. Where available, GPS coordinates may also be used to provide location information. In some embodiments, a hybrid Visual-Inertial Tracker may incorporate a SLAM/VSLAM system with an Extended Kalman Filter (EKF), providing various inputs to the EKF to track the pose of camera(s) 180 and/or UE 100. The Kalman Filter (KF) is a widely used method for tracking and pose estimation. Specifically, the KF operates recursively on a sequence of noisy input measurements over time to produce a statistically optimal estimate of the underlying system state, which may include estimates of unknown variables. The EKF linearizes non-linear models to facilitate application of the KF.

In some embodiments, the pose of the camera may be used to recalibrate sensors in IMU 170, and/or to compensate for and/or remove biases from measurements of sensors 185 and/or sensors in IMU 170. For example, IMU 170 and/or sensors 185 may output measured information in synchronization with the capture of each image frame by camera(s) 180 by UE 100. When the camera pose can be estimated accurately, for example, based on VLSAM (e.g. successful detection of one or more corresponding feature points in images) then the VSLAM estimated camera pose may be used to apply corrections to measurements by IMU 170 and/or sensors 185 and/or to recalibrate IMU 170/sensors 185, so that measurements by IMU 170/sensors 185 may more closely track the VSLAM determined pose.

In another embodiment, depth data from a depth sensor, which may be captured in conjunction with the capture of a depth-image by camera(s) 180, may be used to generate and incrementally update a 3D or volumetric model of the environment in real-time (or offline). For example, the current camera pose may be obtained by tracking a live depth-image frame relative to the 3D model based on the observed available depth data. As one example, each depth-image in a sequence of captured depth-images may be used with real-time SLAM to produce and/or incrementally update a 3D model while simultaneously tracking the pose of camera(s) 180 based on the depth data in each frame. With depth sensors and SLAM techniques users may be able to generate a smooth incrementally updating 3D reconstruction. In some embodiments, to save power, the depth sensors may be enabled to acquire depth information, when the SLAM based 3D reconstruction techniques determine that information that is new to an existing 3D model has been imaged.

Further, in instances, where 3D reconstruction capability is unavailable UE 100, the captured image data along with camera pose and other sensor data captured or measured in conjunction with the capture of image frames or the determination of camera pose may be stored in memory 130, medium 160 and/or sent to a server using transmitter 114, where the data may be processed offline to obtain a 3D model and/or map of the environment. Accordingly, one or more methods disclosed herein may also be performed offline by a server in communication with UE 100.

In some instances, the 3D model may take the form of a textured 3D mesh, a wireframe model, volumetric data set, a CAD model etc., which may be used to render the 3D environment being modeled. For example, in embodiments where a 3D mesh is used, keyframes in a VSLAM technique may be used to acquire a point cloud representation of an environment. The term point cloud refers to a set of data points in a coordinate system, such as, for example a 3D coordinate system with X, Y, and Z coordinates. The point cloud representation may then be converted into a 3D mesh using an appropriate scattered data interpolation method. In some instances, a sparse point cloud representation, which is based on a set of scattered data points, may be obtained and used during 3D reconstruction.

Further, in some embodiments, processing unit(s) 150 may further comprise a Positioning Engine (PE) or Position Determination Module (PDM) 156 (hereinafter PDM 156), which may use information derived from images, sensor and wireless measurements by UE 100 either independently, or in conjunction with received location assistance data to determine a position and a position uncertainty estimate for UE 100. For example, LADM 158 may process location assistance information comprising multipath and visibility map assistance information, PRS timing pattern and/or muting information, etc., which may then be used by processing unit(s) 150 to select a signal acquisition/measurement strategy and/or determine an initial location. In some embodiments, processing unit(s) 150 may also be capable of processing various other received such as Long Term Evolution (LTE) Positioning Protocol (LPP) or LPP extensions (LPPe) messages including assistance information either directly or in conjunction with one or more other functional blocks shown in FIG. 1.

In some embodiments, UE 100 may include one or more UE antennas (not shown) which may be internal or external. UE antennas may be used to transmit and/or receive signals processed by transceiver 110 and/or SPS receiver 140. In some embodiments, UE antennas may be coupled to transceiver 110 and SPS receiver 140. In some embodiments, measurements of signals received (transmitted) by UE 100 may be performed at the point of connection of the UE antennas and transceiver 110. For example, the measurement point of reference for received (transmitted) RF signal measurements may be an input (output) terminal of the receiver 114 (transmitter 112) and an output (input) terminal of the UE antennas. In a UE 100 with multiple UE antennas or antenna arrays, the antenna connector may be viewed as a virtual point representing the aggregate output (input) of multiple UE antennas. In some embodiments, UE 100 may measure received signals including signal strength and TOA measurements and the raw measurements may be processed by processing unit(s) 150.

The methodologies described herein may be implemented by various means depending upon the application. For example, these methodologies may be implemented using modules in hardware, firmware, software, or any combination thereof. For a hardware implementation, the processing unit(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using code, procedures, functions, and so on that perform the functions described herein. Any machine-readable medium tangibly embodying instructions may be used in implementing the methodologies described herein. For example, software codes may be stored in a non-transitory computer-readable medium 160 or memory 130 that is connected to and executed by processing unit(s) 150. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates hybrid photo navigation and mapping, image processing, SLAM, tracking, modeling, 3D reconstruction, and other tasks performed by MM 152, NM 154, CVM 155 and/or PDM 156 on processor 150. For example, memory 160 may hold data, captured still images, depth information, video frames, program results, 3D models, keyframes, as well as data provided by IMU 170, various sensors 185.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support Advanced Forward Link Trilateration (AFLT)/hybrid AFLT/Reference Signal Time Difference (RSTD)/OTDOA measurement and positioning, in part, by using location assistance information. Computer-readable media 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 112 indicative of instructions and data. The instructions and data may cause one or more processors to implement hybrid photo mapping and navigation and/or AFLT/hybrid-AFLT/RSTD/OTDOA measurement and positioning, and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processing unit(s) 150, it should be understood that all or part of a primary memory may be provided within or otherwise co-located/coupled with processing unit(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions 1108 stored thereon, which if executed by at least one processing unit(s) 150 may be operatively enabled to perform all or portions of the example operations as described herein. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, for example as shown in FIG. 1B, display 190 may be a wearable display or a heads-up display, which may be operationally coupled to camera 180, processing unit(s) 150, and/or other functional units in UE 100.

Figure 2:
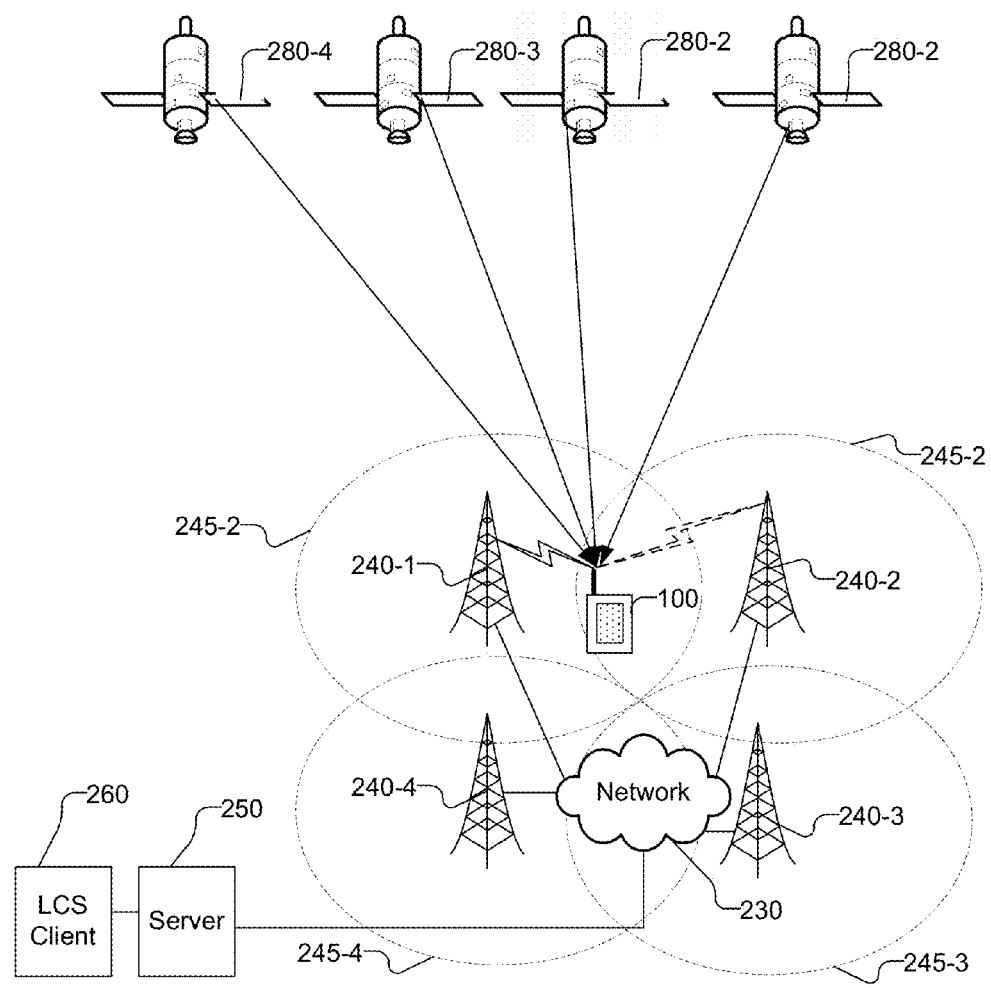
FIG. 2 shows an architecture of a system capable of providing Location Services to UEs including the transfer of location assistance data or location information.

FIG. 2 shows an architecture of a system 200 capable of providing Location, and/or Navigation services to UEs including the transfer of location assistance data or location information. In some instances, system 200 may be used for mapping services, such as for use with hybrid photo mapping, in a manner consistent with embodiments disclosed herein.

For example, in some instances, server 250 may optionally send maps or other location assistance information to UE 100 (or a plurality of UE's 100), which may be used by UE 100 to estimate an approximate location. Further, one or more image frames, video, and/or other measurements, which may be captured by UE 100 may sent to server 150. For example, in some instances, based on the received location assistance data (e.g. by LADM 158) UE 100 may obtain measurements, including wireless signal measurements, and/or measurements using sensors 185, which may be captured in conjunction with the capture of images by camera(s) 180. The captured images and/or measurements may be used locally by UE 100 and/or may be sent to server 250. For example, the captured images and measurements may be used by UE 100 and/or server 150 to generate or update models/maps of a location and/or to update Base Station Almanac (BSA) data. The updated data/BSA data may then be sent to one or more UE 100 as location assistance data.

As illustrated in FIG. 2, the UE 100 may communicate with server 250 through network 230 and base station antennas 240-1-240-4, collectively referred to as antennas 240, which may be associated with network 230. Server 250 may, in some instances, provide the functionality of one or more of a mapping server, location server, BSA server, position determination entity (PDE), or another network entity. The transfer of the location and other information may occur at a rate appropriate to both UE 100 and server 250.

In some embodiments, system 100 may use messages such as LPP or LPPe messages between UE 100 and server 250. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In some embodiments, UE 100 may receive and measure signals from base station antennas 240, which may be used for position determination. Antennas 240 may form part of a wireless communication network, which may be a wireless wide area network (WWAN), wireless local area network (WLAN), a wireless personal area network (WPAN), and so on. The term "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of personal area network. The techniques may also be implemented in conjunction with any combination of WWAN, WLAN and/or WPAN. For example, antennas 240 and network 230 may form part of, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN.

UE 100 may also receive signals from one or more Earth orbiting Space Vehicles (SVs) 280-1-280-4 collectively referred to as SVs 280, which may be part of a SPS/GNSS. SVs 280, for example, may be in a GNSS constellation such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

For simplicity, only one UE 100 and server 250 are shown in FIG. 2. In general, system 100 may comprise multiple cells indicated by 245-$k$ ($0 \le k \le N_{cells}$, where $N_{cells}$ is the number of cells) with additional networks 230, LCS clients 260, mobile stations 100, servers 250, (base station) antennas 240, and Space Vehicles (SVs) 280. System 100 may further comprise a mix of cells including macrocells and femtocells in a manner consistent with embodiments disclosed herein.

MS 100 may be capable of wirelessly communicating with server 250 through one or more networks 230 that support positioning and location services, which may include but are not limited to the Secure User Plane Location (SUPL) location solution defined by OMA and the Control Plane location solution defined by 3GPP for use with an LTE serving network. For example, Location services (LCS) may be performed on behalf of LCS Client 260 that accesses server 250 (which may provide functionality associated with a location server) and issues a request for the location of UE 100. Server 250 may then respond to LCS Client 260 with a location estimate for UE 100. LCS Client 260 may also be known as a SUPL Agent—e.g. when the location solution used by server 250 and UE 100 is SUPL. In some embodiments, UE 100 may also include an LCS Client or a SUPL agent (not shown in FIG. 1) that may issue a location request to some positioning capable function such as PDM 156 within UE 100 and later receive back a location estimate for UE 100. The LCS Client or SUPL Agent within UE 100 may perform location services for the user of UE 100—e.g. provide navigation directions or identify points of interest within the vicinity of UE 100.

Server 250 may take the form of a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 2, the UE 100 may communicate with server 250 through network 230 and antennas 240, which may be associated with network 230. UE 100 may receive and measure signals from antennas 240, which may be used for position determination. For example, UE 100 may receive and measure signals from one or more of antennas 240-1, 240-2, 240-3 and/or 240-4, which may be associated with cells 245-1, 245-2, 245-3 and 245-4, respectively, in order to facilitate position determination. UE 100 may also determine its position using signals received from SV 280, which may form part of an SPS. As another example, UE 100 may use a hybrid position location scheme, using a Global Positioning System (GPS) or SPS receiver 140 on UE 100 and computing its position based on measurements from sensors 185 and/or captured images, in combination with AFLT and GPS measurements (e.g. from SVs 280). In some embodiments, a combination of GNSS', terrestrial measurements (e.g. AFLT, cell sector measurements, WLAN measurements, OTDOA) and/or sensor measurements (e.g. measurements using IMU 170, sensors 185, cameras or image sensors (which may include depth sensors), etc.) may be used to obtain a position estimate.

In some embodiments, a position estimate obtained may be a coarse and/or initial position estimate and may be refined in a manner consistent with disclosed embodiments. In general, measurements made by UE 100 may be combined with network related measurements, such as those stored in a BSA, to enhance the availability and accuracy of the computed positions of UE 100 and/or antennas 240.

As another example, in OTDOA based positioning, which is used with WCDMA and LTE, UE 100 may measure time differences in received signals from a plurality of base station antennas 240. Because positions of the antennas 240 are known, the observed time differences may be used to calculate the location of UE 100. For example, the measured time difference of arrival of Positioning Reference Signals (PRS), which is termed the Reference Signal Time Difference (RSTD), may be used along with the absolute or relative transmission timing of each cell, and the known position(s) of antennas 240 for the reference and neighboring cells, to calculate the position of UE 100.

In AFLT based positioning, which is used with CDMA, UE 100 may measure phases of pilot signals, which are synchronized to an absolute time scale (e.g. GPS time), and transmitted from four base station antennas 240-1-240-4. The measured phase of a pilot signal from an antenna 240-$i$, $1 \le i \le 4$ may be used to calculate the distance between UE 100 and the respective antenna. The set of distance measurements may be used to calculate location of UE 100 provided the time offsets of antennas 240 are known.

MS 100 may obtain a measure of time synchronization of the forward link cell signal by comparing the time of arrival of a cell signal with the absolute time scale. UE 100 may record the known GPS position and GPS time at the time of this measurement and using the known position of the cell transmitter(s), such as antenna 240-1, a time of arrival bias for the cell signal may be determined.

Determination of the time bias for a cell signal is known as Forward Link Calibration (FLC). In some instances, UE 100 may send raw measurement information to server 250, which may perform the forward link calibration. For example, the distance correction is quantified as a forward link calibration value (FLC). FLC improves positioning accuracy because even a synchronization variation of the order of a 100 ns between cells will translate into 30 meters of ranging error. Therefore, FLC accuracy facilitates optimal performance in terrestrial positioning systems. However, even within a cell 245, FLC may vary with position of UE based on a variety of factors such as signal attenuation, blockage, multi-path, etc. For example, in indoor or dense urban environments, where blockage and/or multipath is more prevalent, mapping the indoor or dense urban environment and/or obtaining accurate position estimates may present challenges. For example, various signals, such as signals from SVs 280, and/or from one or more antennas 240 may be unavailable or weak thereby limiting position determination techniques that are based solely on wireless signals.

Accordingly, embodiments disclosed herein facilitate mapping and navigation in indoor environments using hybrid photo mapping and navigation techniques disclosed herein and thereby improving position estimation and extending terrestrial positioning system deployment and utilization.

FIGS. 3A and 3B show tables indicating the availability of different positioning techniques in a variety of situations along with associated location precision, positioning ambiguity, and power consumption. Position ambiguity refers to the possibility that a determined position using the technique is incorrect. For example, several feature points in two images taken at different locations may match, making it difficult to determine the actual location of the mobile device.

As shown FIG. 3A, SPS based positioning techniques are typically highly available outdoors globally, exhibit high outdoor precision, low outdoor position ambiguity, and fair power consumption. However, as shown FIG. 3B, SPS signals may not always be available indoors and, when available indoors, SPS signal strength may be weak. Thus, indoor precision may be lower and indoor ambiguity higher than when a mobile station is outdoors. Further, a Line Of Sight (LOS) to the satellites facilitates time stitching with SPS systems. Time stitching refers to the capability to accurately correlate and align measurements obtained from various sensors to captured images to a common time scale.

Inertial navigation techniques are highly available both indoors and outdoors and exhibit fair power consumption but, because of drift and other biases, their precision is lower ranging typically from medium to good. IMU measurements are more easily time stitched and correlated with other measurements.

Photo navigation is highly available both indoors and outdoors but exhibit higher power consumption and higher indoor and outdoor location ambiguity. For example, similar images may sometimes be obtained at various different locations making identification of a single location difficult without additional images and/or other sensory input. On the other hand, when mobile stations can be localized to an area, then location precision is high. For example, there may be a limited set of locations from where a known landmark is visible, so based on a captured image, the location of the UE may be accurately determined for both mapping and navigation. Captured images may be time stitched and correlated with other measurements relatively quickly.

WAN based location techniques exhibit good availability both outdoors and indoors and, when available, have relatively strong signals. However, WAN signals have limited global availability because there may areas that are not served by cellular signals. WAN based location techniques exhibit relatively low power consumption, have medium outdoor and indoor precision, low indoor and outdoor location ambiguity and may be time stitched with fair ease.

Finally, LAN or beacon based location techniques exhibit fair availability outdoors and good availability indoors but signal strength may vary significantly with location. LAN signals have good global availability, exhibit fair power consumption, have medium outdoor and indoor precision, low indoor and outdoor location ambiguity and may be time stitched with fair ease.

As can be seen from FIGS. 3A and 3B and the above description, the location techniques have various strengths and drawbacks when used individually. Thus, when using current location determination techniques, which rely on one of the above methods, mapping and/or navigation solutions are often sub-optimal.

Therefore, methods disclosed herein combine measurements from a plurality of sensors with images and wireless signal measurements to facilitate location determination. For example, SPS have global scope, while strong WAN signals may help with low power background navigation in a localized indoor environment, especially in situations where the locations of wireless access points are known. When combined with the excellent local precision provided by camera images and measurements from inertial sensors, which can provide additional input when wireless signals are unavailable, more robust and accurate positioning solutions may be enabled.

However, there is a dearth of maps, especially for indoor locations. Further, even when indoor maps are available, the indoor maps do not provide context relative to a larger area wide map. Therefore, a user may not be able to place the location of rooms, hallways etc in a wider area map. Without accurate maps, optimal utilization of position information is difficult. For example, navigation instructions from point A (e.g. indoors) to point B (e.g. outdoors) or vice versa cannot be provided without an available map. Therefore, obtaining reliable and accurate maps inexpensively for indoor locations may facilitate more optimal use of existing mobile device functionality. Therefore, disclosed techniques also combine measurements from a plurality of sensors with images and wireless signal measurements to facilitate mapping and/or navigation. For example, image based navigation techniques may be enhanced when used with precise "photo" and/or visibility maps. Similarly, precise calibration provided by images captured by a camera may be used to provide effective indoor wireless navigation. These and other techniques disclosed herein are used with mobile devices both to obtain and update maps of locations and to enable navigation functionality.

In some embodiments, Mapping Module (MM) 152 may be used to place UE 100 in a "mapping mode". In the mapping mode, camera(s) 180 on UE 100 may capture images or video at a specified frame rate in conjunction with measurements from sensors 185 (including the magnetometer, altimeter and barometer) and IMU 170. For example, a user may place UE 100 in mapping mode when using UE 100 for mapping. In mapping mode, the camera may be placed in a "wide angle" mode. Further, in mapping mode, high resolution images may be captured, but the images may be compressed, filtered, or altered to reduce size. In some embodiments, the images captured by camera(s) 180 may be stored locally at high resolution and/or sent to server 250 for later processing. For example, in some embodiments, the images may be reduced to a vector map, or vector images, which provide variety of different content and resolutions to suit different needs.

Further, in some embodiments, when in mapping mode, CV module 155 may be configured to use "Manhattan World" assumptions. Manhattan World (MW) assumptions, which are used extensively to produce 3D reconstructions of urban structures from images and/or point clouds, assume that scenes or images captured by a camera consist of piece-wise planar surfaces with dominant directions. Typically, when MW assumptions are used to determine building geometry, a predominance of three mutually orthogonal directions in scene is assumed. Level and plumb surfaces and edges may also be assumed. MW assumptions facilitate 3D reconstruction from 2D images. Various well-known techniques are available for 3D reconstruction based on captured images. For example, in one exemplary embodiment, dominant plane directions (e.g. X, Y, Z) may be extracted from an image, hypotheses may be generated for planes in the image (e.g. based on feature point densities in the image) and a 3D reconstruction obtained by associating image pixels with one or more of the planes. When used with depth sensors, MW assumptions may facilitate faster 3D reconstruction based on the acquired depth information. When inertial sensors are used to determine device orientation and camera angle, MW assumptions may facilitate more efficient discernment of vertical and horizontal edges and surfaces and their respective locations, orientations and relationships.

In some embodiments, a mapping mode on a UE 100 may be activated opportunistically when the user is travelling through an area and/or is incentivized to travel through an area: (i) that has not been mapped and/or (ii) an area where updating map data is desirable. For example, when in mapping mode, based on crowdsourced data (or the absence of such data) pertaining to a location at a server the UE may request a "survey" of the interior and/or exterior of a structure. In another embodiment, opportunistic crowdsourcing may be used, and the user may be asked to enter mapping mode based on an estimated location of the UE. In some embodiments, the user's consent may be obtained and the user may actively participate in opportunistic crowdsourced mapping. In some embodiments, for example, where camera 180 is wearable, image capture and sensor data collection may be automatically triggered and the data may be stored on UE 100 and/or transmitted to server 250 based on previously obtained user consent. The term "crowdsourcing" is used to refer to the collection and subsequent aggregation of the collected image, RF, sensor and positioning related measurements from a plurality of mobile stations and/or PDEs. In some embodiments, upon detecting that a user is near a structure which may be desirable to map (or to update an existing map), the user may be asked or incentivized to perform the mapping in a manner consistent with disclosed embodiments.

Figure 4:
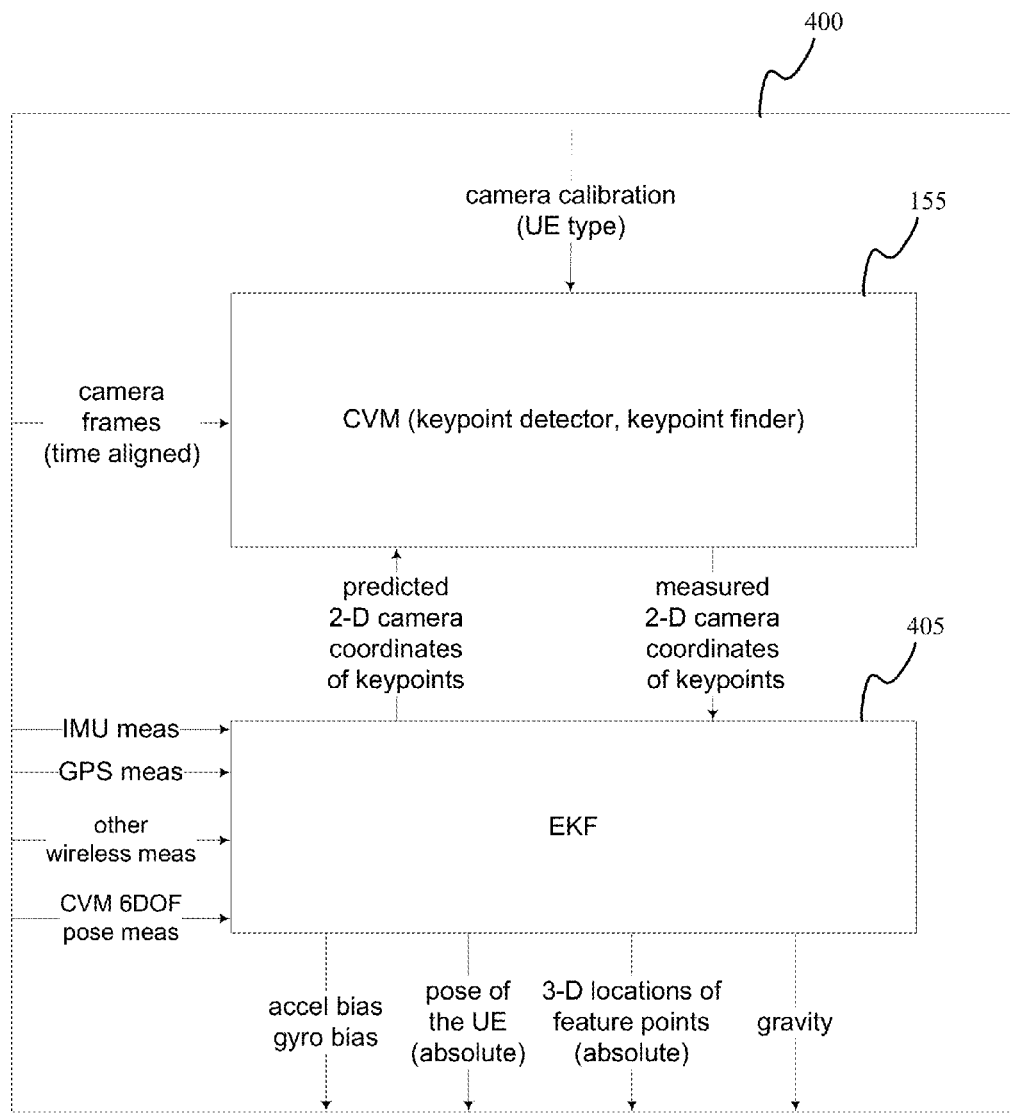
FIG. 4 is a block diagram of an exemplary application 400 capable of performing mapping in a manner consistent with disclosed embodiments.

FIG. 4 is a block diagram of an exemplary application 400 capable of performing mapping in a manner consistent with disclosed embodiments. In some embodiments, portions of application 400 may run on UE 100 using processing unit(s) 150 and/or on a server wirelessly coupled to UE 100. In some embodiments, application 400 may use a SLAM-EKF topology utilizing CVM 155 and an EKF component 405. In some embodiments, functionality associated with application 400 may be implemented by hardware, or software or a combination thereof.

As illustrated in FIG. 4, the CVM 155 may receive image frames that are synchronized to the capture of wireless and non-wireless measurements. Depending on available functionality, the image frames may be captured as a series of still images and/or as part of video. Embodiments utilizing video capture can, for example, receive images at 30 frames per second. Other embodiments may utilize other frame rates. CVM 155 may use camera calibration. Intrinsic camera calibration may include principal point, focal length, and radial distortion. Extrinsic camera calibration parameters may include rotation and translation information relative to IMU 170. Rotation can be estimated or, in some instances, the IMU may be assumed to be aligned with the camera.

As outlined above, CVM 155 may employ any of a variety of algorithms to determine and detect keypoints in image frames. In some embodiments, the keypoint detection can result in the identification of measured 2D camera coordinates of keypoints, which are relayed to EKF component 405. The EKF component 405 may further share predicted 2D camera coordinates of keypoints with the CVM 155 to narrow the keypoint search space. When one or more keypoints are located by CVM 155, the 2D camera coordinates of these keypoints may be provided to EKF component 405. In some embodiments, CVM 155 may also provide a 6 Degrees Of Freedom (6DOF) camera pose, which may be determined by CVM 155, based on the locations of keypoints in image frames.

In some embodiments, the input 6DOF camera pose (provided by CVM 155) may be refined by EKF 405 to obtain a pose of the UE in absolute coordinates based on inputs supplied by CVM 155 and/or IMU and/or wireless measurements. The 6DOF camera pose determined by the EKF may also be used to calculate a location of the target. EKF component 405 may utilize the 2D keypoint measurements from CVM 155 along with wireless and/or non-wireless measurements to track the 6DOF pose of camera 180/UE 100 in absolute coordinates. For example, EKF component 405 may use a recent GPS or other wireless measurements (when available) to anchor measurement sets to an absolute coordinate framework. The term "absolute coordinates" or "global coordinates" is used to refer to absolute SPS coordinates such as provided by GPS or any other global coordinate system such as the World Geodetic System (WGS) standards used for mapping and navigation. In some embodiments, EKF component 405 may provide a gravity vector in addition to the 3D locations of detected features points in image frames to CVM 155. In some embodiments, gravity and 3-D locations of keypoints may be obtained during or as part of the pose estimation process. For more information regarding determination of gravity, see "Visual-Inertial Navigation, Mapping And Localization: A Scalable Real-Time Causal Approach" (2010) by Eagle S. Jones, Stefano Soatto. In systems using conventional visual-inertial techniques a trajectory of a UE may be determined. However, conventional techniques do not disclose 3D structural envelope determination and the determination of indoor maps based on the measurements, where the structural 3D envelope information and the indoor maps are registered to absolute coordinates.

In some embodiments, the mapping application may direct the user to obtain additional measurements while using the EKF. For example, the user may be instructed to walk into an already mapped area to allow for loop closure detections to happen and then global bundle adjust the estimated map/key points, the trajectories, and the loop closure detects, and, if available, GPS fixes, from the data collection iterations jointly.

By determining UE/camera pose relative to the target and anchoring measurements to absolute coordinates, an absolute pose of the UE can be determined by EKF 405.

EKF component 405 may further determine any biases associated with IMU 170 and/or other sensors, which may be used to mitigate drift. Global optimization techniques such as Global Bundle Adjustment (GBA) may be used by the EKF 405 to correct for drift and in the computation of a closed loop trajectory of UE during mapping as outlined further below.

Figure 5A:
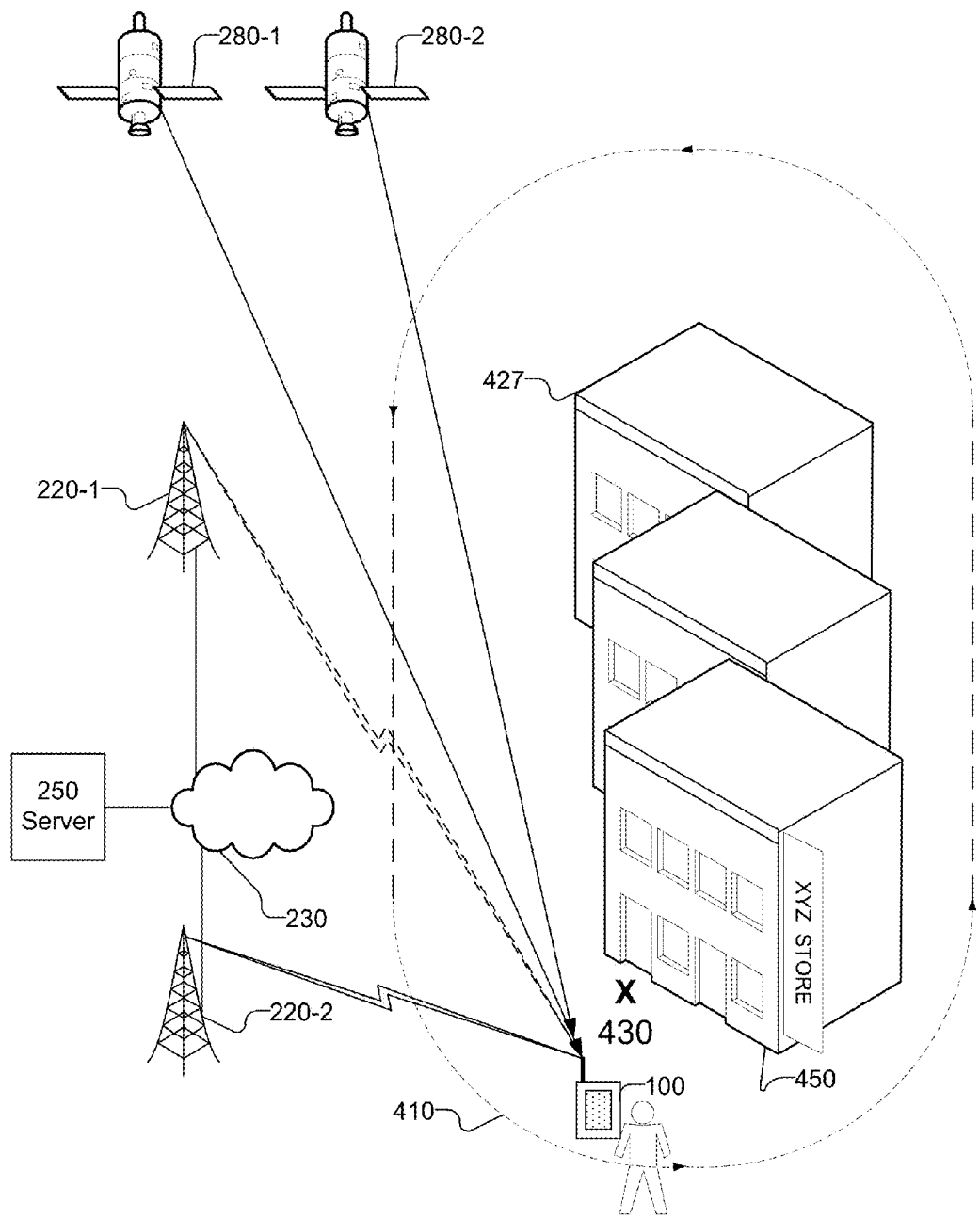
FIG. 5A shows the user in a location where signal reception from satellite vehicles (SVs) and/or wireless networks may be available.

FIG. 5A shows the user in a location where signal reception from SVs 280 and/or wireless network 230 may be available. In mapping mode, images may be collected by UE 100 as the user travels around an outdoor location—such as a building—as directed by the application. For example, the user may be directed to follow trajectory 410 and images may be collected by UE 100 as the user travels around structure 427. Because SPS and cellular measurements are typically available outdoors, trajectory 410 may be determined based on the SPS/cellular measurements. Where signal outages occur, timestamped measurements by IMU 170 and/or sensor bank 185 may be used in conjunction with timestamped captured images may be used to stitch across the outages. For example, timestamped images of the structure 427 may be captured by camera(s) 180 in conjunction with timestamped measurements from IMU 170 and/or sensor bank 185 to track user movements. In some embodiments, the timestamps may be used to correlate measurements from different sensors and/or to timestitch across signal/measurement outages as explained further below.

In some embodiments, MM 152 may direct the user to capture images of salient visual features including externally visible signs (such as store sign "XYZ STORE"), windows, doors, overhangs, corner points, neighboring structures, etc. For example, the inference that a wall is both "exterior" and "interior" can be made if it has a window in it. That window, as viewed from the outside and inside, may be used to align the two different views of the same wall. Accordingly MM 152 may direct a user to capture features that are likely to be visible from both inside and outside the structure.

In some embodiments, the captured images may be processed by CVM 155 to determine descriptors associated with one or more images, to determine an external 3D structural envelope of structure 427, trajectory 410, and/or processed to obtain other information in a manner consistent with embodiments disclosed herein. In some embodiments, the captured image may be sent to a server and feature descriptors and processing of measurements correlated to the captured images may occur at the server, which may return results such as a closed loop trajectory registered to absolute coordinates and/or an external 3D structural envelope registered to absolute coordinates to UE 100. In some embodiments, the trajectory of the user may corrected to account for drift by returning to visual features previously photographed. A "closed loop" trajectory may then be determined and used to correct for drift. The external 3D structural envelope of structure 427 registered to absolute coordinates may be determined based on the corrected and/or closed loop trajectory. For example, in some embodiments, the captured images and measurements may be processed using application 400 on UE 100.

After collection of images, wireless (e.g. SPS and cellular) measurements and/or non-wireless (e.g. IMU 170 and sensor bank 185) measurements, the user may enter retail store 450 from outdoor location 430.

Figure 5B:
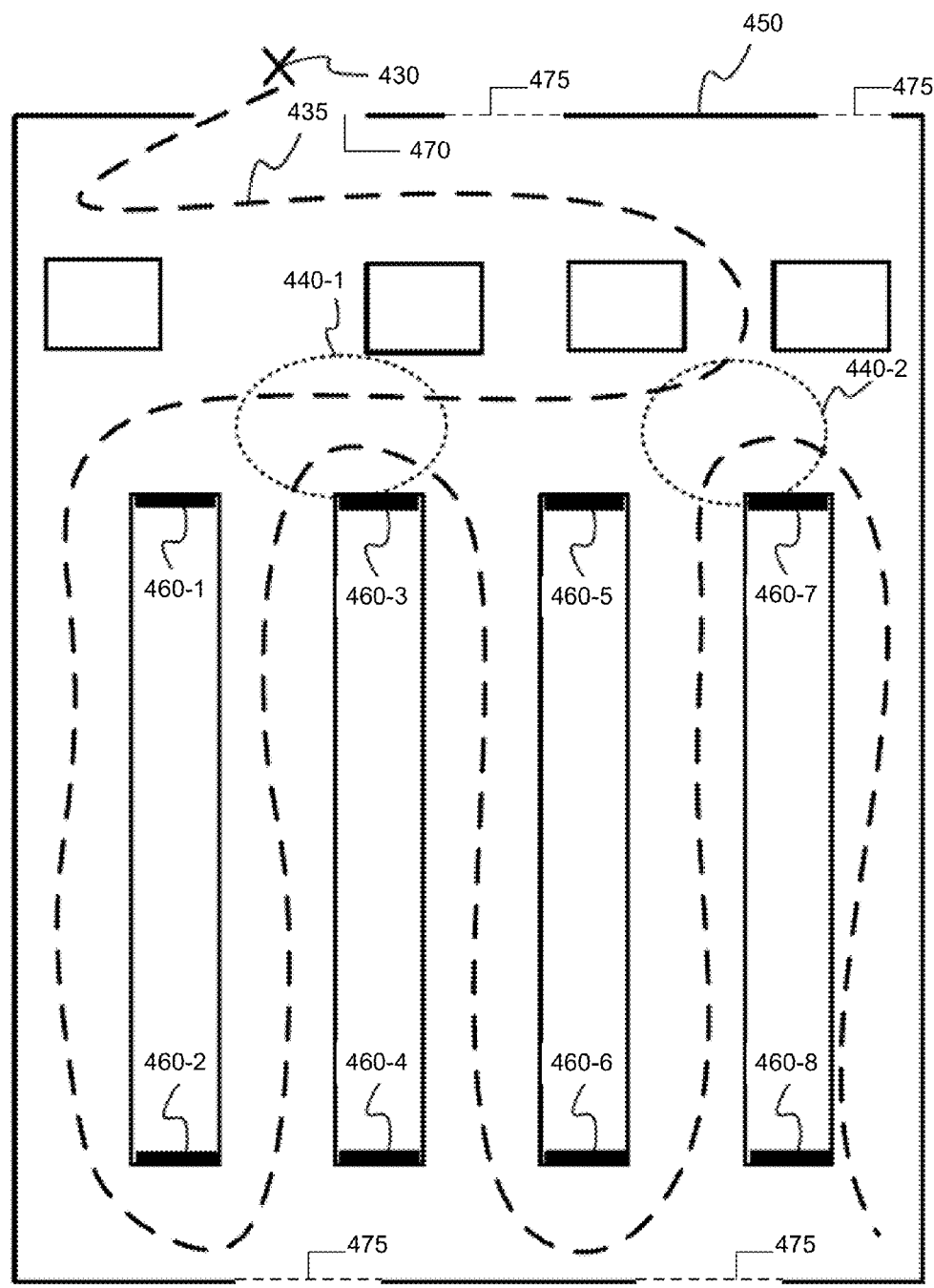
FIG. 5B is a simplified overhead view of a retail store, illustrating an exemplary approach to create and map targets for an indoor navigation system.

FIG. 5B shows a simplified overhead view of retail store 450, illustrating an exemplary approach to create targets for an indoor navigation system. Targets are salient visual features, which may include aisle signs 460, potentially externally visible features such as entryways 470 and/or windows 475, edges, corner points etc.

As shown in FIG. 5B, a map of the retail store 450 may be generated using input received from UE 100. A UE user (e.g. a store manager) may gather data to create a map of retail store 450. In some embodiments, a mapping application such as MM 152 on UE 100 may direct the user to capture images of aisle signs 460-1 through 460-8, entryways 470, windows 475 and/or other externally visible features, edges, corner points, images of the overhead lighting arrangement, etc.

For example, a user may walk through the store with the mobile device, following path 435 that passes through or near locations that are likely to be traversed by users. Path 435, shown in FIG. 4B, is provided merely as an example. In some embodiments, MM 152 may suggest a more exhaustive path to be followed by the user. For example, in some embodiments, MM 152 may direct a user to traverse store 450 in a series of closed loops. In one embodiment, the user may be directed to turn in one direction at each intersection. For example, the user may be directed to turn right at each intersection (right hand rule) or left at each intersection (left hand rule) to increase the likelihood that traversal of the location will occur in a series of closed loops. During traversal of path 435, UE 100/MM 152 may receive inputs from LADM 158 (if location assistance information is available for the location), CVM 156 (in relation to the processing of captured images), and/or PDM 156 (e.g. to determine an estimated location of UE 100).

In some embodiments, UE 100/MM 152 may utilize timestamped visual and inertial information from camera(s) 180, IMU 170 and/or sensor bank 185 to track the user's movement through the store. For example, timestamped images of the store may be captured by camera(s) 180 in conjunction with timestamped measurements from IMU 179 and/or sensor bank 185 to track user movements. In some embodiments, the timestamps may be used to correlate measurements and/or to timestitch across signal/measurement outages. For example, if wireless measurements are unavailable from time t1 to t2, then, measurements by IMU 170 may be used, in part, to determine the location of UE during the time interval from t1 to t2 using the SPS-based location of UE 100 determined at time t1. Further, images captured by camera(s) 180 and/or measurements by sensor bank 185 and/or other wireless measurements may be correlated with measurements by IMU 170 based on timestamps and used to correct biases of IMU 170, and/or a location/trajectory determined using IMU 170 in a manner consistent with embodiments disclosed herein. In some embodiments, tracking may be performed using captured images and IMU measurements synchronized with the capture of the images.

In some embodiments, path 435 may also include locations (such as a location 430 just outside store 450 or near windows 475) where the UE 100 may use SPS based positioning to enable location information provided by the mapping application to be anchored in an absolute coordinate system provided by SPS receiver 140. For example, in some embodiments, MM 152 may commence mapping at a location where SPS signals are available and may determine the location of UE 100 at various times by timestitching measurement sets based on timestamps associated with the measurements and/or by using timestamped captured images.

In some embodiments, if accurate SPS signals are available at one or more points (e.g. near windows 475) during traversal of path 435, then MM 152 may determine additional SPS-based UE locations, which may be used as additional or new anchors based on their accuracy, the number of visible satellites, or the availability of carrier phase.

As the user walks through the retail store 450, various targets can be designated. Designation can occur automatically and/or manually, depending on desired functionality. In the illustrated example aisle signs 460 (comprising signs 460-1 through 460-8) are designated as the targets. For example, MM 152 may include a user interface by which the store manager can capture an image of an aisle sign and designate it as a target. Manual designation may be useful in instances where the person designating the target 110 has a knowledge that the target 110 is unlikely to change (thereby helping ensure that it will be subsequently recognizable as a target to a vision based positioning (VBP) system).

In some embodiments, the data gathered by US 100 can be sent to a server to build a map of the retail store 450 for subsequent use by customers. For example, timestamped images of the targets 110 and timestamped measurements pertaining to the position of UE 100 at the time the images were captured can be sent to a server, which may builds descriptors for each of the targets. Descriptors can include, for example, feature points on a target. Image descriptors may take the form of Scale Invariant Feature Transform (SIFT), Speeded-Up Robust Descriptors (SURF), etc., which are well-known in the art. The determined/stored image descriptors may be utilized at a later point by an image or object detector to determine the pose of a UE.

In some embodiments, UE 100 may determine an initial trajectory corresponding to path 435. For example, in one embodiment, the trajectory may be determined based on the poses of UE 100 and/or 3D locations of feature points as output by EKF 405. In some embodiments, the initial trajectory and/or images and/or other measurements may be sent to a server wirelessly coupled to UE 100. The server may use knowledge of the UE's initial location 430 and an available external 3D envelope of the structure registered to absolute coordinates to determine an indoor map. For example, the server may use one or more of: i) externally visible indoor features such as doors, windows, etc to align the trajectory with an available 3D external envelope of the structure determined earlier, or ii) internally visible exterior keypoints in the vicinity of the structure in the captured images, along with an available 3D external envelope to generate an indoor map. For example, knowledge of keypoints in the vicinity of the structure may be available based on images captured during an exterior mapping phase, such as when capturing images along trajectory 410.

For example, once a map of the store has been generated, the image descriptors may be provided to a customer as location assistance data, to facilitate target recognition and perform drift/bias corrections for IMU 170. In some embodiments, depending on the capabilities available on UE 100, the map may be built on UE 100 based on the timestamped captured images, and timestamped wireless (e.g. SPS or cellular) and non-wireless (e.g. IMU 170 or sensor bank 185) measurements.

When traversing retail store 450 collecting data for map creation, the determined locations (e.g. the pose of UE 100 output by EKF 405) may be subject to drift. For a 1% drift error, for example, a path length of 100 m will result in a drift of about 1 m. To correct for drift errors, loop closure detection (LCD) and global bundle adjustment (GBA) can be performed on the data gathered by UE 100/MM 152 and/or poses of the UE 100 output by EKF 405 after the user has completed gathering the data. In some embodiments, LCD and GBA may be performed on a server (e.g., a server creating the map). For example, UE 100 may send the collected data and/or an estimated trajectory to a server, which may perform LCD and GBA tasks. However, depending on the capabilities available on UE 100, one or more of LCD and GBA may be performed on UE 100.

In some embodiments, LCD may identify previously viewed features in images to determine drift. Using the data gathered by UE 100/MM 152, CVM 155 may use feature information from images captured by camera(s) 180 to determine areas 440 with common feature information. For example, a first set of coordinates may be determined for a first static feature in a first image based on a camera pose and measurements associated with the first image. The first static feature may be identified in a subsequent image captured by the camera and associated with a second set of coordinates. Because the location associated with the feature has not changed, the LCD algorithm may determine a drift over the trajectory of UE 100. For example, the LCD algorithm may "close the loop" by assigning the first set of coordinates to any subsequent visit of the same feature. A GBA algorithm can then be used to correct and align the measurements to mitigate or eliminate drift error from an initially estimated trajectory (corresponding to path 435) and calculate an updated "closed-loop" trajectory (also corresponding to path 435), which may be used to derive a map of retail store 450.

As a simplified example, when a user traverses a location 440-1 in store 450 for a first time, the CVM 155 on UE 100 may mark a first feature in a first captured image associated with location 440-1 and determine a first estimated location associated with the first feature. For example, the first feature point may be associated with the coordinates $(x1, y1, z1)$. When the user passes through the area 440-1 again, and captures the first feature in a second image, the coordinates associated with the feature may be estimated as $(x2, y2, z2)$. Similarly, a second feature associated with area 440-2 may be associated with coordinates $(x3, y3, z3)$ during a first pass and $(x4, y4, z4)$ during a second pass. The difference in the coordinates associated with a static feature may be attributed to drift. Because the drift occurs continuously, the entire trajectory may be corrected.

In one embodiment, once the user has completed gathering data, the feature information associated with locations 440-1 and 440-2 (along with all the other data) such as an estimated trajectory associated with path 435 may be provided to a server. The server may perform an LCD algorithm and identify areas 440-1 and 440-2 through which the store manager passed twice, and determine that coordinates $(x1, y1, z1)$ and $(x2, y2, z2)$ correspond to the first feature, while coordinates $(x3, y3, z3)$ and $(x2, y2, z2)$ correspond to the second feature. Accordingly, the LCD process may close loops by assigning coordinates $(x1, y1, z1)$ to the second visit of the first feature and $(x3, y3, z3)$ to the second visit of the second feature. The drift may be viewed as occurring over the initially estimated trajectory.

Global Bundle Adjustment may then be used to correct for drift and determine a closed-loop trajectory associated with path 435. For example, the closed loop trajectory may be reflect UE locations adjusted to mitigate drift. The closed loop trajectory may be used, in part, to determine a map of store 450.

Once a map is created, it can be provided or made available to one or more applications (e.g. NM 154) on UE 100. The map may be used to navigate through retail store 450. Further, when using the map, the location of the customer's mobile device can be tracked using the techniques outlined above. Although, the estimated location may draft during navigation, the location of UE 100 may be corrected whenever NM

154 (or CVM 155) detects any previously stored targets, such as exemplary targets 460-1 through 460-8. For example, image or object detection algorithms in CVM 155 may provide a camera/UE pose to correct drift in the manner explained above.

Depending on desired functionality, the map can include any of a variety of additional features. For example, the map can incorporate floor plans, and may be augmented with product placements, daily specials, and the like, to enhance the user experience as the user navigates through the retail store 450.

In some embodiments, the identity and locations of Wi-Fi or WLAN access points (APs) as determined by UE 100 during the map building phase may be determined and/or stored. In some embodiments, the known locations of APs (e.g. from map data during navigation) may also be used to obtain an estimate of the location of UE 100. For example, WLAN measurements such as Received Signal Strength Indication (RSSI), Round-Trip Time (RTT), and/or other AP wireless signal measurements) may be used to determine an estimated location of UE 100 in store 450. In some embodiments, the estimated location may be used by a VBP algorithm to reduce processing loads related to target detection by limiting the search for targets to detect to those in the vicinity of the estimated location. Such functionality can beneficial, for instance, when a customer starts a navigation application using the store map at some point after entering retail store 300. With no location initially, NM 154 may benefit from an estimated location determined based on WLAN measurements.

For example, if NM 154 determines that UE is located near the front of the retail store 450 (e.g. near area 440-1) then it is likely that NM 154 may encounter on or more of the targets 460-1, 460-3, 460-5 or 460-7 near the front of store 450. However, it is unlikely that NM 154 will detect any of the targets 460-2, 460-4, 460-6 or 460-8 at the back of store 450. Thus, there NM 154 can eliminate targets 460-2, 460-4, 460-6 or 460-8 from consideration when searching for features based on its current location.

Note that the techniques described above in relation to FIG. 5B may also be used in conjunction with outdoor mapping in FIG. 5A. For example, a closed loop trajectory may be determined as outlined above for path 410 (in FIG. 5A) based, in part, on locations associated with previously imaged and stored features.

Figure 6A:
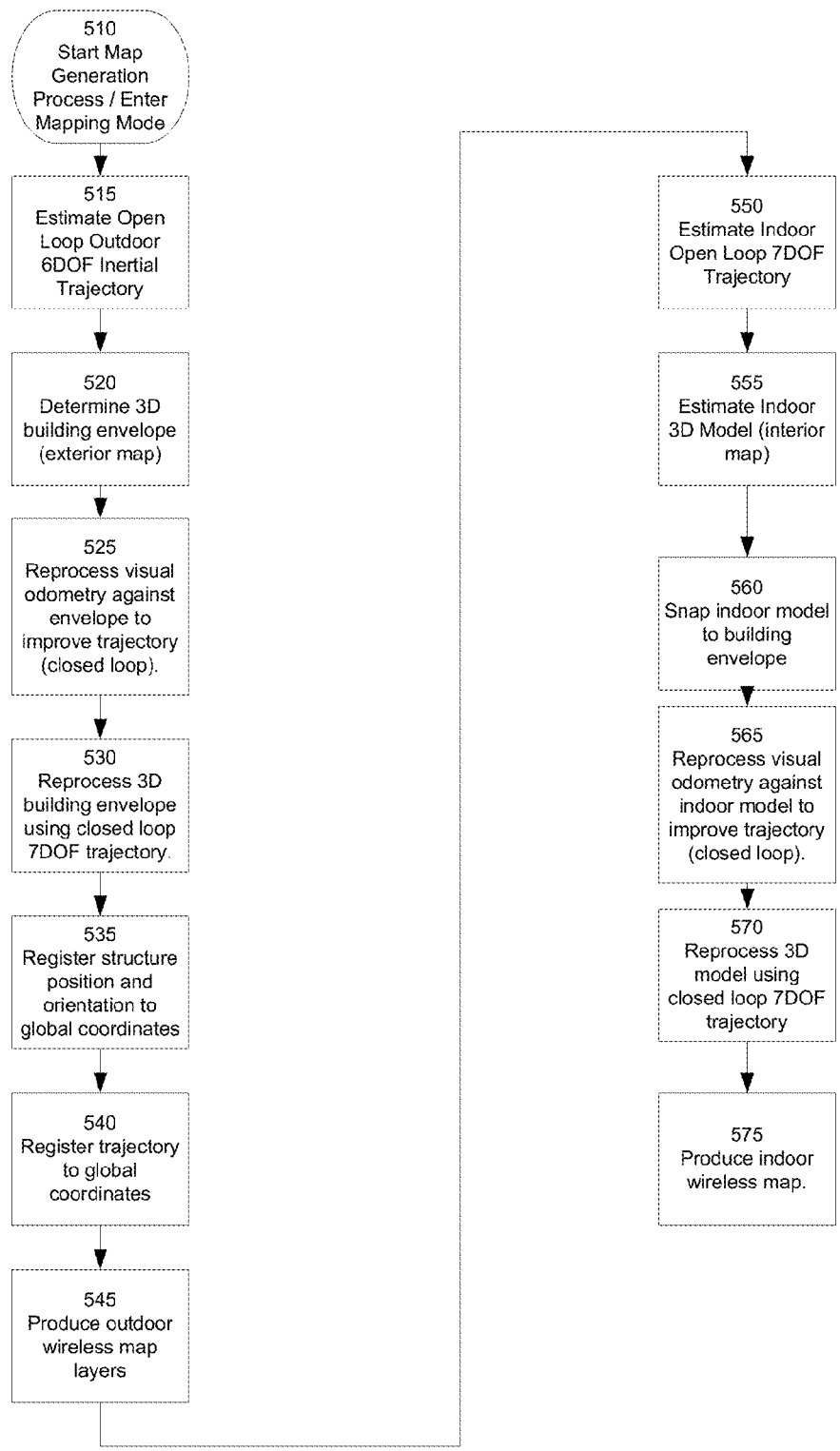
FIG. 6A shows a flowchart of an exemplary method for wireless map generation.

FIG. 6A shows a flowchart of an exemplary method 500 for wireless map generation. In some embodiments, method 500 may be performed by UE 100. In some embodiments, portions of method 500 may be performed by UE 100 and/or server 150. In step 510, UE 100 may enter a mapping mode.

In "mapping mode" UE 100 may collect continuous GNSS, camera and inertial data and other sensor data at a relatively high rate. Further, in mapping mode, sensory measurements such as RF measurements, GNSS measurements and data from inertial, magnetometer, altimeter, and/or barometric sensors may be captured in conjunction with the capture of images. In the mapping mode actual GNSS measurement data may be used such as continuous carrier phase observables (as opposed to the "position outputs" normally seen in smart phones) to provide a further anchor for the visual odometry process and to stabilize the UE clock state, so long as Line of Sight (LOS) conditions exist for at least one or more SPS satellites 280.

Non Line of Sight (NLOS) conditions may exist to one or more satellites at various points in time, but if LOS conditions exist to other satellites at those times, then, carrier phase observations of the LOS satellites may be stitched together.

Figure 6B:
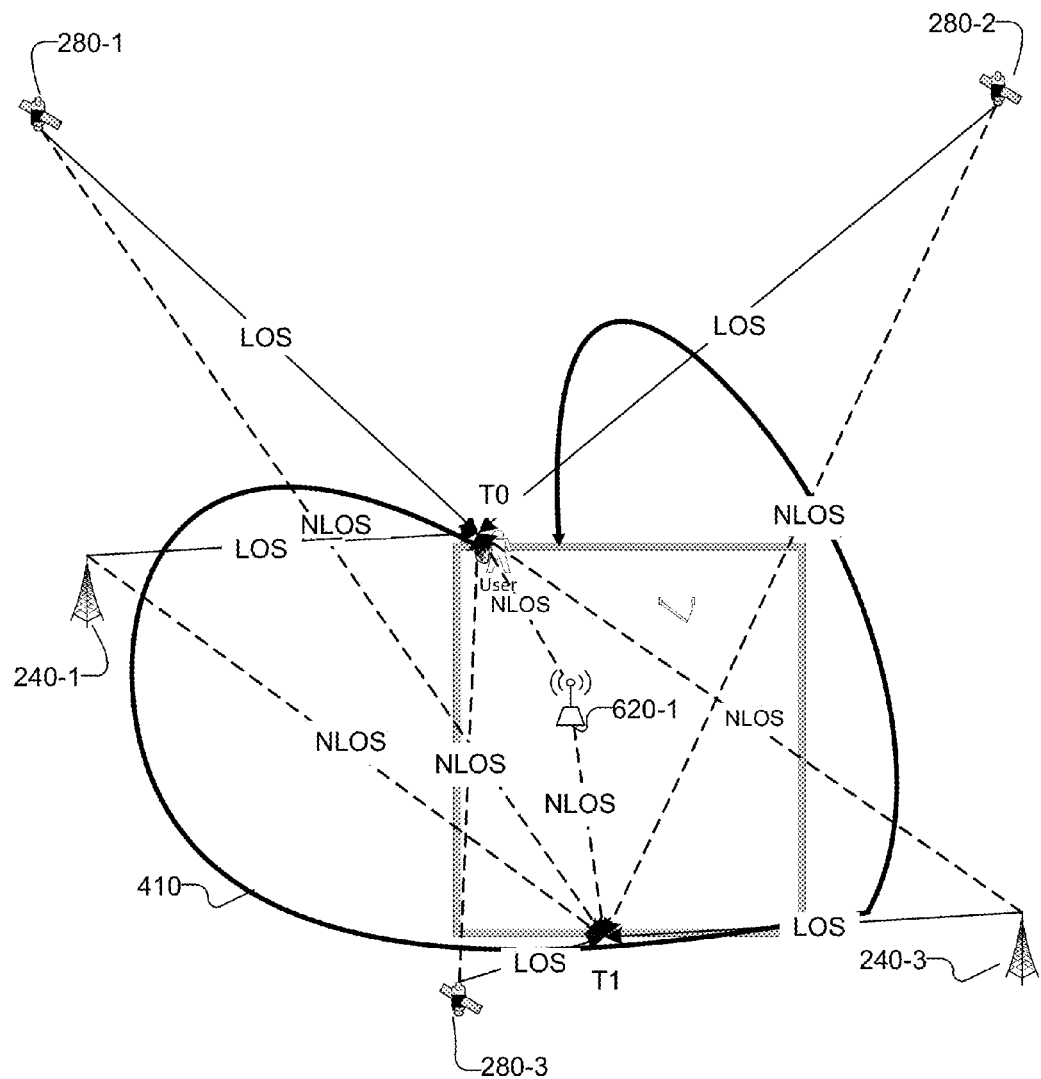
FIG. 6B shows Line of Sight and Non Line of Sight conditions that may occur at various locations and points in time as a UE follows a trajectory.

For example, as shown in FIG. 6B, at time T0, when following trajectory 410, UE 100 may receive LOS signals from SVs 280-1 and 280-2, antenna 240-1, while signals received from SV 280-3, antenna 240-3 and AP 620-1 may be NLOS. Further, at a subsequent time T1 and at a different location on trajectory 410, UE 100 may receive LOS signals from SV 280-3 and antenna 240-3, while signals from SVs 280-1 and 280-2, antenna 240-1 and AP 620-1 may be NLOS.

Thus, if LOS conditions exist with respect to one or more of SVs 280-1, 280-2, and/or 280-3 at various times, then, the carrier phase observations of the LOS satellites may be stitched together. In situations where there is a brief outage of the carrier phase observable (often referred to as a cycle slip) or Non LOS (NLOS) conditions exist, data from a combination of inertial sensors, barometric sensors, magnetometers, and/or image based odometry may be used to "stitch" across the outages and determine UE position.

Referring to FIG. 6A, in step 515, a 6-DOF trajectory of the UE may then be determined based on the combination of SPS/GNSS and sensor measurements. For example, inertial stitching may be used when inertial trajectory drift is less than some threshold (e.g. less than half a GPS L1 wavelength).

In step 520, a 3D building envelope (or external 3D structural envelope) and/or an exterior 3D map may be obtained based on the captured images, measurements by IMU 170, measurements by sensors 185, and wireless (SPS and/or RF) signal measurements. In some embodiments, the user may be directed to capture images of neighboring landmarks, structures, building overhangs etc while keeping a structure (such as structure 427) in view. The term "building envelope" refers to the outer shell of the building/structure that serves as a physical separator between the interior and the exterior environments of a building. In some embodiments, MW assumptions may be used, in part, to determine a building envelope.

In step 525, a closed loop trajectory of UE 100 may be determined. For example, in instances, where LOS conditions exist to more than one satellite thereby permitting simultaneous multiple carrier phase observations the inertial trajectory may be stabilized. For example, the user/MS may be directed to return to visual feature(s) that were previously photographed during the data collection. Camera poses for the two images may be computed, for example, using VSLAM techniques. Based on camera poses associated with the two images, IMU (gyro and accelerometer errors) may be modeled such that the trajectory (is re-estimated to return to the visual feature(s) with no apparent errors. This closed loop trajectory may be viewed as having 7 Degrees Of Freedom (7-DOF) indicating 3 dimensions of position uncertainty, 3 dimensions of rotational uncertainty, and an additional "dimension" of receiver clock bias. The receiver clock bias is useful when relating wireless ranging measurements such as those associated with GNSS, WWAN and WLAN RTT, where a timing error on the order of 1 ns translates into ranging errors on the order of 1 foot. In LOS conditions to GNSS satellites, corrected carrier phase measurements may have a precision on the order of 1 cm, but an unknown constant of integration. This constant of integration may be determined by a number of techniques known in the kinematic carrier phase processing art. It should be appreciated that, without knowledge of the absolute constant of integration, the changes in carrier phase over the trajectory help to determine a precise UE position and clock bias profile over the trajectory. The precise UE position and clock bias profile over the trajectory are important for the creation of precise wireless delay maps at fine precision.

In many cases, absolute errors on the order of meters may remain, but distortions due to wireless multipath variation can be effectively mitigated, providing a precise trajectory and therefore a precise map with multiple precisely associated map layers, where the associations may all be accurate to better than a meter, even if the absolute position of the structure is not known to better than a meter at the time of mapping. While the device is in LOS to GNSS signals, then, it is possible to create a highly precise trajectory that can be used to not only cooperatively calibrate IMU sensors, but also determine the larger biases and stability of other measurement sources, such as WWAN, WLAN, barometric sensors and magnetometers.

In step 530, in some embodiments, the 3D building envelope may then be re-determined based on the re-estimated 7-DOF trajectory. In some embodiments, MW assumptions may be used to determine the building envelope. For example, it may be assumed that most walls are plumb (perfectly vertical) and meet at 90 degree angles. Thus, in this way, the initial, "open loop" 3D photo model of the building may be adjusted to rectangular walls and vertically aligned. The walls may also be assumed to be perpendicular or parallel. Then, the trajectory of UE 100 may be re-calculated from the visual odometry data against this adjusted 3D photo model. In step 535, the position of the building may then be registered to global coordinates, in part, by using GNSS pseudorange measurements. In some embodiments, the external envelope of the structure may be adjusted based on overhead images in combination with local views of roof overhangs or other features.

In step 540, the re-estimated trajectory may then be registered to global coordinates. In some embodiments, the pseudorange measurement errors arising on account of multipath, satellite position, satellite clock drift, residual ionospheric and tropospheric signal delays, etc. may be mitigated using differential methods, where more accurate models for satellite position and clock, ionospheric activity and tropospheric wet delay etc may be used to mitigate errors. Furthermore, to the extent that carrier phase observations are concurrently available, multipath errors may be reduced using code-carrier smoothing and measurements with large code-carrier variance may be weighted appropriately.

In some embodiments, carrier phase differential GNSS processing may be used to further improve the device trajectory estimate with either floating or fixed (resolved) carrier cycle ambiguities. Carrier phase differential GNSS processing typically uses a nearby reference receiver at a known benchmark location that has been registered to a global coordinate system. In this case, residual atmospheric errors largely cancel out and cycle ambiguities may be resolved.

In an alternate embodiment, the device trajectory may be stitched together using visual odometry to form a synthetic carrier phase differential process over time. Because satellite-related errors and atmospheric errors change relatively slowly, the precision of the local map may be maintained initially without differential processing, and differential processing may be added subsequently for map registration and clarification when the appropriate reference data becomes available. The reference data may include observations of actual satellite position, orientation and clock offset.

In some embodiments, the satellite orientation may be determined while accounting for the phase pattern of the satellite antenna so that wide area satellite carrier phase corrections may be determined and applied. If the satellite orientation or any other factor creating signal phase variation is determined using a terrestrial reference receiver network, with or without the satellite antenna phase corrections, the resultant "differential corrections" may then be localized for use in the map processing.

In some embodiments, in step 545, measurements obtained in mapping mode from sensors may also be used to generate and/or update one or more existing maps, which may be stored on server 250. These maps may include one or more of an outdoor 2D road map or floor plan, a photo map, which may include 3D navigable feature database, a heat map, which may indicate signal strengths for one or more antennas at various locations, and/or a spatially variable FLC map, which may indicate signal delays for an antenna at various locations. In some embodiments, one or more of the maps may be stored as and/or aggregated with measurements in existing map layers at differing levels of position granularity. The term "map layer" as used herein refers to information, such as location assistance information, tailored to a position and position uncertainty of a UE. There may be different map layers for each measurement type, where all map layers may be registered to the same local or absolute coordinates. For example, for each wireless signal of interest, there may be at least one of: delay, signal strength or attenuation map layers. There may be a barometric variation annotation layer. There may be a magnetic field variation layer, providing local corrections to a standard Earth magnetic field model.

In some embodiments, when in mapping mode, UE 100 may request and/or receive location assistance information to determine an initial location estimate, which may also be provided in the form of map layers. For example, location assistance information comprising a first FLC value may be provided in a first map layer to UE 100 based on an estimated first position and position uncertainty of UE 100. When the position/position uncertainty of UE 100 is refined or re-estimated based on the previously provided location assistance information, FLC values based on the refined position estimate/position uncertainty may be retrieved from another map layer to facilitate a more accurate determination of UE position.

In general, map layers may comprise various other types of information. For example, map layers may comprise one or more of: a received signal strength map layer that correlates a received signal strength with map locations; a Signal to Noise Ratio (SNR) map layer correlating SNRs with map locations; a Line of Sight (LOS) map layer indicating map locations where LOS conditions are likely with respect to one or more antennas; a Non-Line of Sight map layer, the NLOS map layer indicating map locations where NLOS or body blocked conditions are likely with respect to one or more antennas, etc.

In some embodiments, the map layers may also comprise at least one multipath layer to provide an indication of the extent of multipath for the antenna for locations in the BSA. Further, in one embodiment, the multipath layer may further comprise at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna. In some embodiments, UE 100 may use information in one or more map layers to estimate a location and location uncertainty, and based on the location and location uncertainty may request additional map layers. In some embodiments, a plurality of map layers may be provided to UE 100 based on the location/location uncertainty of UE 100. In general, location assistance information comprising map layers may be provided to UE 100 based on protocols used for communication with UE 100, available bandwidth for communication, signal conditions, cost, communication, memory and/or processing capability available at UE 100 and various other parameters.

Similarly, when measurements are received from UE 100, the measurements may be used to generate and/or update existing map layers. For example, the new measurements may replace one or more older measurements used to determine one or more map layers. For example, measurements older than some time period, and/or measurement deemed unreliable or inaccurate (e.g. with a position uncertainty estimate exceeding that in the current measurement) in one or more map layers may be updated. In some embodiments, the new measurements may be aggregated with the older measurements. For example, when statistically significant, an average, median and/or other statistical measure may be computed by aggregating the measurement with existing measurements to produce one or more updated map layers. It should be appreciated that an appropriate version control mechanism is required to maintain timeliness, precision and accuracy of the provided map layers.

Figure 7A:
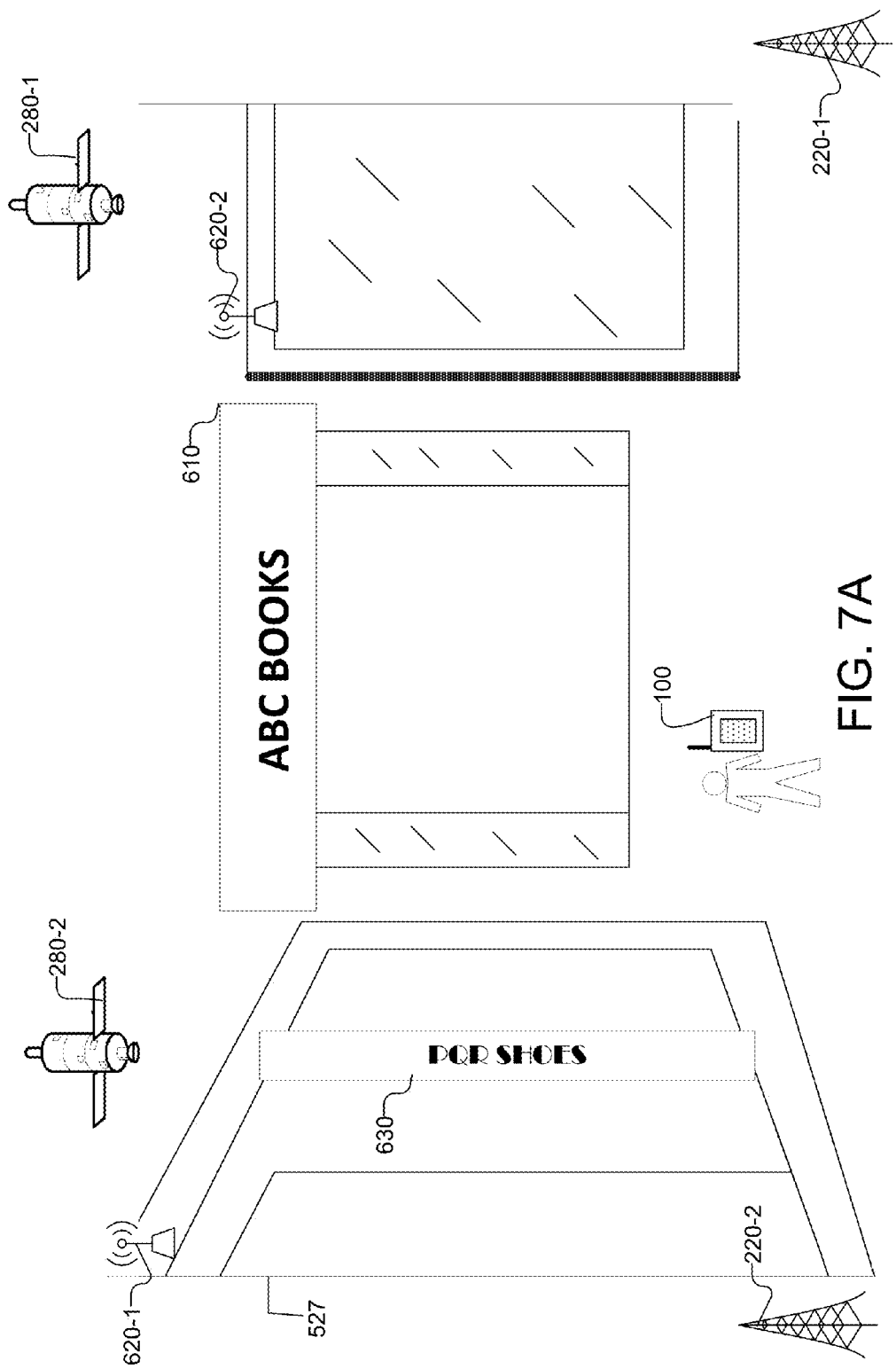
FIG. 7A shows user with a mobile station within a structure.
Figure 7B:
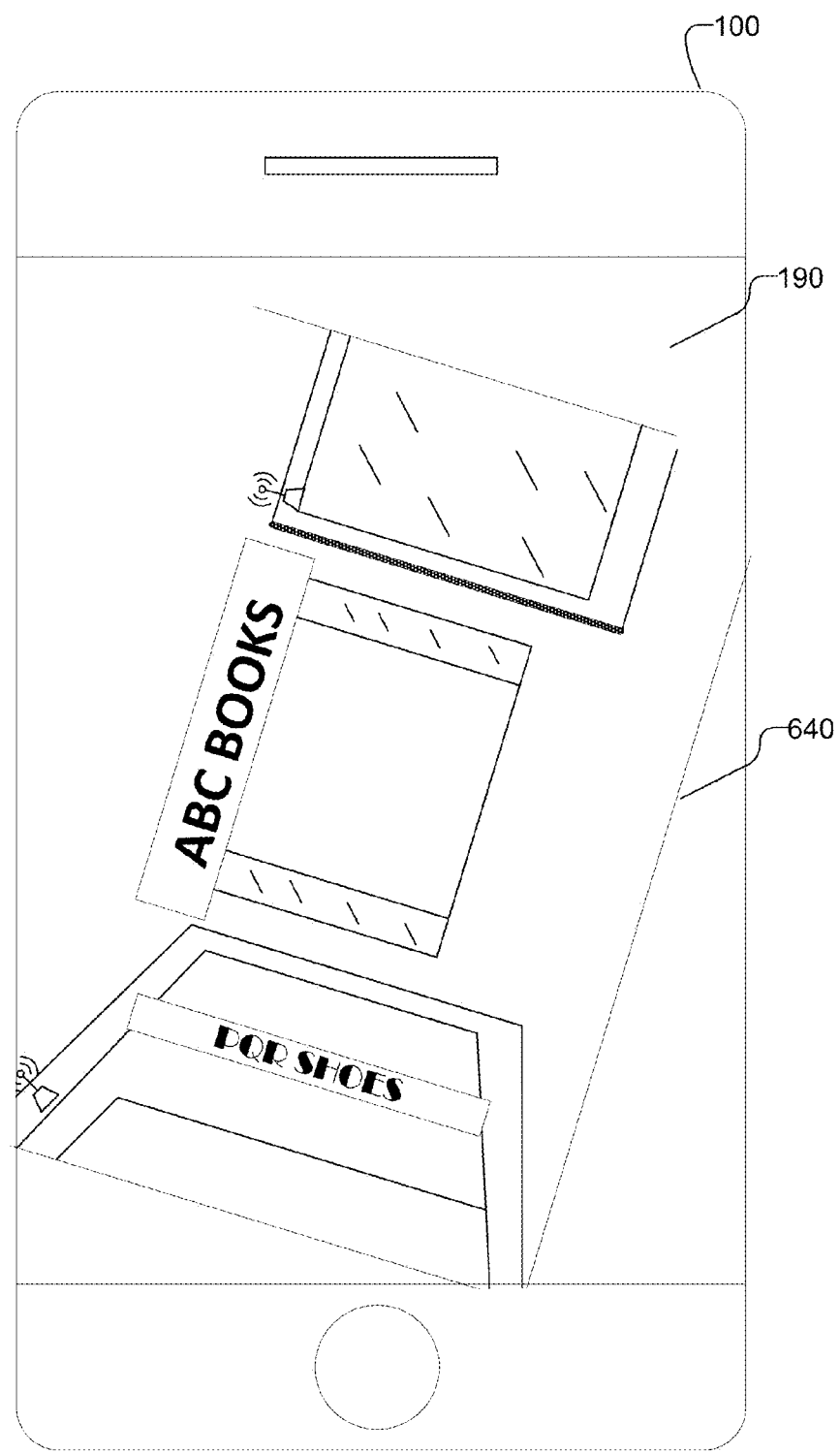
FIG. 7B shows an image captured by a camera on a mobile device at an indoor location.

FIG. 7A shows user with a mobile station within structure 527. As shown in FIG. 7B, an image 640 captured by camera 180 and displayed on display 190 on UE 100 within the mall may show one or more store signs such as points of interest 610 and 630, which are shown in FIG. 7A as stores "ABC BOOKS" and "PQR SHOES", respectively. In structure 527, UE 100 may be able to receive signals intermittently from one or more of SVs 280. However, signals from Access Points (APs) 520 may be available. For example, APs 620-1 and 620-2 may be access points for a WLAN network deployed inside structure 527 and may be accessible to UE 100. However, as discussed above, in some instances, UE 100 may receive signals from SVs 280 and/or antennas 240-1 and 240-2 only intermittently when within structure 527.

In some embodiments, as the user traverses the indoor location within structure 527 with UE 100 in mapping mode, images and other sensory data detailed above may be continue to be collected. In some embodiments, the user may be directed to capture images of feature points such as pictures, signs, room numbers, various other markers, and/or "corner points", which may serve to uniquely identify a location. For example, the user may capture points of interest 610 and 630 corresponding to store signs "ABC BOOKS" and "PQR SHOES", respectively. In some embodiments, SLAM/VSLAM techniques may be used in conjunction with location assistance data and other measurements (e.g. wireless measurements and/or sensor measurements) to obtain a map, in part by determining a camera pose using feature points such as points of interest 610 and 630 in the captured images. In some embodiments, EKF based techniques may be used to determine a location/trajectory followed by a user/UE.

Referring to FIG. 6A, in some embodiments, in step 550, the data, including images captured by camera(s) 180, measurements by IMU 170, measurements by sensors (including barometric/altimeter/magnetometer) 185, RF measurements and/or SPS measurements (if any) captured during a traversal of the indoor area may be processed by UE 100 and/or sent to server 250 to determine an 7-DOF indoor trajectory of UE 100.

In step 555, a 3D model and/or a map of the indoor area may be generated from the images captured in conjunction with other sensor measurements. For example, altimeter, magnetometer, barometric and IMU measurements may be used, in part, to generate the indoor maps and/or as indicators of reliability of the generated maps. Further, in instances where one or more APs are available, RF measurements including Round Trip Time (RTT) and/or Received Signal Strength Indicators (RSSI) may be used to characterize the APs such as APs 620-1 and 620-2 (in FIG. 6A). In some embodiments, MW assumptions may be used to reconstruct a 3D model of the indoor area from the captured images. For example, CVM 155 may be used to perform the reconstruction and/or the reconstruction may be performed offline by server 250.

In some embodiments, collections of indoor maps may be organized with pointers to connected/nearby spaces, which may be indoor or outdoor. For example, when a map is obtained or being generated for a single structure, information about adjacent structures and/or structural units may be added to facilitate navigation up to and/or into the neighboring structure. For example, in a multi-story office building, if maps are divided into individual stories, elevator shafts and stairwells may be included in each map, as well as contextual information for each floor a user may stop at along the way (model of hall outside of each door). The "connector" maps may be separate or may be provided as a layer overlapping each individual map.

In step 560, the indoor model generated in step 555 may then be registered/aligned with the building envelope determined in step 530. In some embodiments, externally visible indoor structural features such as windows, doors etc., which may be visible both internally and externally, may be used when registering images to an external map. In some embodiments, each room or appropriate indoor structural unit may be resolved individually, and then snapped to the external envelope.

For example, the inference that a wall is both "exterior" and "interior" can be made if it has a window in it. That window, as viewed from the outside and inside, may be used to align the two different views of the same wall. Further, the wall thickness may be inferred by the difference between the distance from window edge to exterior corner in the external view and the same window edge to the associated inside corner in the interior view. Wall thickness may also be inferred from the depth of the window sill, if a view of the sill or surround is readily available. In many, but not all, cases, all exterior walls of a structure will have effectively the same thickness. So it may be possible to develop the indoor map assuming this is the case, but checking that assumption and looking for exceptions in the data, as necessary. Multiple methods may be employed to determine external wall thickness and combined to form a more accurate measure than if only one method were used. Once wall thickness is known, walls that have both an interior and exterior surface may be precisely registered and aligned, creating a greater internal consistency and making it possible to register the indoor map to the more accurately derived external shell shape, orientation and location.

In some cases, interior walls, those that do not have an external surface, may have a different thickness than external walls. Again, a first pass at the map model may assume that all interior walls have the same width. For example, in the United States, interior, non-load-bearing, walls are often framed with 2×4's while exterior walls may use 2×6's or 2×8's. Furthermore, exterior siding may add more thickness to an exterior wall. The entire model may be developed by assembling multiple rooms together into a building map and "snapping" them to exterior walls, solving for exterior and interior wall thicknesses in the process. It is also reasonable to expect that the wall thicknesses and/or construction materials in a given structure may be similar to its neighbors. Thus, once a first structure wall thickness is known, neighboring wall thickness may be assumed to be the same, until proven otherwise, or multiple wall thicknesses may be solved for independently and then compared. A similar process may be followed in determining roof pitch, surface areas, etc. as is well known in the art.

In step 565, in some embodiments, the user/MS may be instructed to return to visual feature(s) that were previously photographed during the data collection, an a closed loop trajectory may be determined to mitigate errors in IMU 170 (e.g. gyro and/or accelerometer) errors, so that the trajectory may be re-estimated to return to the visual feature(s) with no apparent errors. In some embodiments, the user may be directed to traverse the indoor area using a series of one or more closed loops to minimize the effect of inertial sensor errors. For example, a right (or left) hand rule, instructing the user to turn right (or left) at every intersection may be used to form closed loops and assure complete coverage of a structure interior.

In step 570, the 3D model of the indoor area may then be reprocessed based on the re-estimated closed loop trajectory from step 365. In some embodiments, in step 375, an indoor map may then be generated based on the 3D model.

In some embodiments, all or part of the collected data may be processed on the UE 100 and/or sent to a server 250 for processing. In some embodiments, if maps are available for neighboring and/or attached structures, the indoor/outdoor maps for the current structure and the attached/neighboring structures may be stitched together, for example, by using exterior images. In some embodiments, pointers/associations to nearby structure maps may be cached in the UE, and/or on the server. In some embodiments, where a "smart glass" or other wearable device is coupled to the phone such as a Bluetooth headset with a camera, the camera on the smart-glass/wearable device may be triggered.

Figure 8:
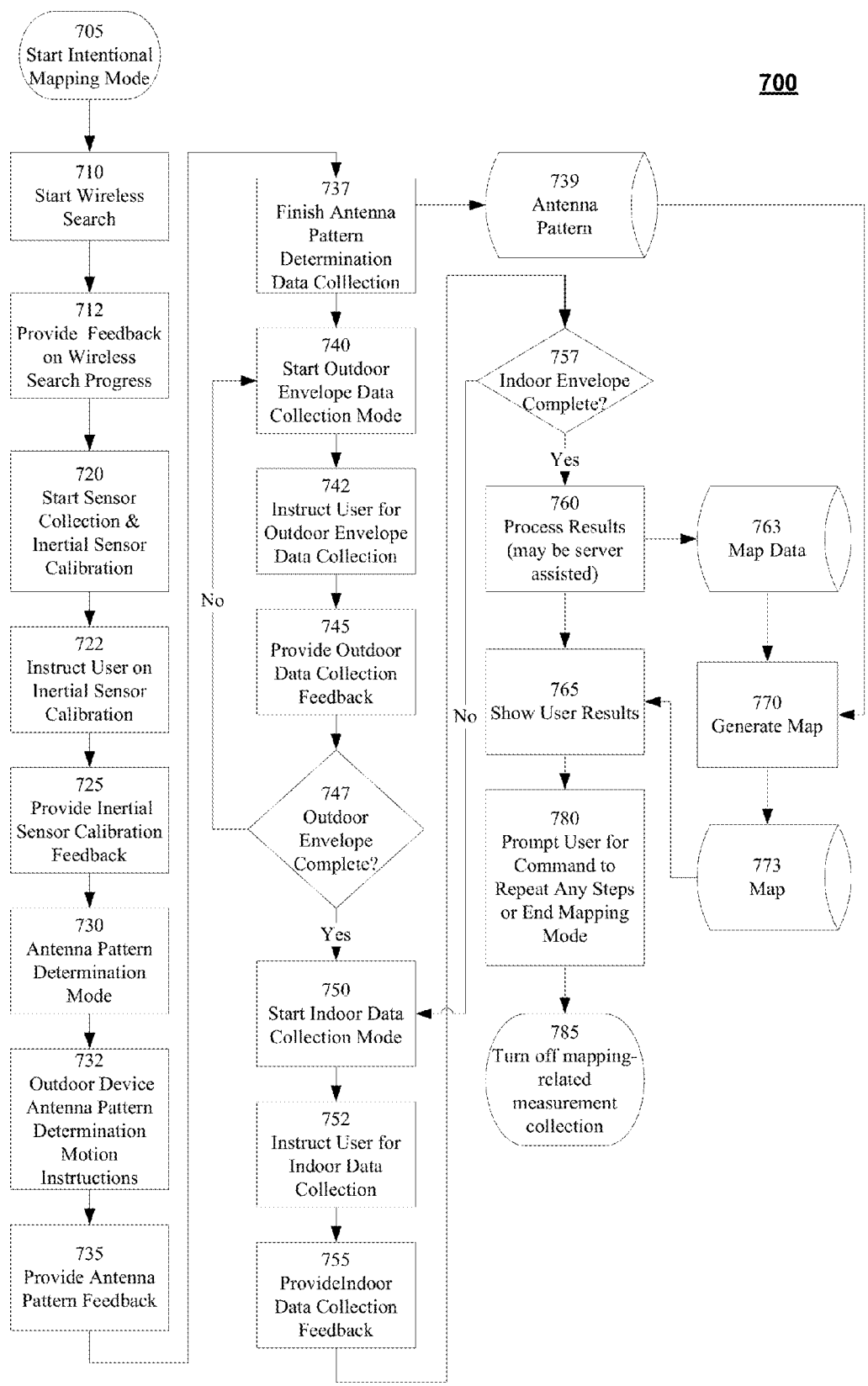
FIG. 8 shows a flowchart for an exemplary method of mapping data collection consistent with disclosed embodiments.

FIG. 8 shows a flowchart for an exemplary method of mapping data collection 700 consistent with disclosed embodiments. In some embodiments, method 700 may be performed by UE 100. In some embodiments, portions of method 700 may be performed by UE 700 and/or server 150. In some embodiments, portions of method 700 may be performed by UE 100 when in a mapping mode. For example, method 700 may be invoked in step 705 and UE 100 may enter or be placed in a mapping mode.

Next, in step 710, a search for wireless signals may be started. In some embodiments, location assistance data requested and/or received from server 150 may be used by UE 100 to select a strategy for wireless signal search. In some embodiments, the location assistance data may include WWAN, WLAN and/or GNSS assistance data. In step 712, feedback may be provided on the wireless signal search. For example, signals may be received from the serving cell and one or more neighboring WLAN cells 245, one or more GNSS SVs 280 and/or one or more WLAN APs 620 and their absolute and/or relative signal strengths noted.

In step 720, one or more sensors on UE 100 may be activated. For example, camera 180, sensors 185, and/or IMU 170 may be activated. In some embodiments, measurements of sensors 185 and/or IMU 170 may be synchronized to the capture of image frames by camera 180. In some embodiments, if wireless positioning (e.g. positioning based on GNSS and/or hybrid measurements) is available based on signals obtained in steps 710/712, then IMU 170 may be initialized with an initial position based on the wireless positioning.

In some embodiments, when UE 100 is placed in mapping mode, sensor measurements may be taken fine granularity in conjunction with and/or based on the video frame rate from 15 fps-30 fps. In some embodiments, one or more sensors may be calibrated using a camera pose determined using CV techniques based on the captured images. In some embodiments, one or more of an image timestamp obtained at an application level, a sensor timestamp obtained from an Application Programming Interface (API), an offset between the timestamps, and/or jitter in camera timestamps based on exposure times may be used for: (i) correlating various sensor measurements, (ii) correlating captured images with the sensor measurements, and/or (iii) time stitching the measurements. In some embodiments, when correlating sensor measurements with images relative timestamps or offsets may be used.

In some embodiments, in step 722, the user may be optionally instructed on calibration of IMU 170. In one embodiment, IMU 170 may be calibrated using images captured by camera 180. For example, the user may be instructed to point the camera at a target object and/or perform a motion sequence. In step 725, the user may be provided feedback related to the motion sequence and/or the progress of calibration. For example Computer Vision (CV) based techniques, may be used to obtain a camera pose for a plurality of images. IMU 170 may be calibrated, in part, by comparing CV based poses for each of the plurality of frames with corresponding IMU determined poses for the frames. In some embodiments, IMU 170 may be calibrated using observation equations that relate CV measurements to IMU 170 error states, which may be modeled using well-known EKF techniques.

In step 730, determination of antenna patterns for an antenna on UE 100 may be initiated. In some situations, antenna pattern determination may be performed outdoors. Each antenna will have its own phase and gain pattern. When the orientation of UE 100 is known, the antenna pattern may be determined with a user holding the device in a typical pose and rotating it around one or more axes.

Accordingly, in step 732, the user may be given instructions pertaining to the motion of UE 100 so that antenna pattern information for UE 100 may be determined. In some embodiments, to facilitate performance of the motion or movement of UE 100, feedback may be provided, in step 735, in terms of a direction to move the device, and/or the extent of completion of the antenna pattern determination process. In some embodiments, the feedback may be provided using Graphical User Interface (GUI) shown on display 190.

In step 737, UE 100 may provide an indication that the antenna pattern determination has completed and antenna pattern 739 for UE 100 may be generated. In some embodiments, antenna patterns determined in step 737 may be further corrected, for example, during step 540 in method 500 (FIG. 5A), based on the estimated orientation of the UE 100 over the course of a trajectory followed, such as, for example, trajectory 410. For increased accuracy and to further mitigate any residual GNSS carrier multipath, in portions of trajectory 410, where observation indicate that carrier multipath is most challenging along the inertial trajectory, with availability of a highly overdetermined trajectory solution, any residual phase errors may be mapped out and removed and/or deweighted. Accordingly, antenna pattern correction may occur even after the completion of step 737 and/or in conjunction with the performance of one or more steps (e.g. 515 through 540 in FIG. 5A) related to the determination of the outdoor trajectory in method 500. In some embodiments, antenna pattern data 739 may be used to mitigate antenna pattern effects on subsequent RF signal characterization.

In step 740, UE 100 may be placed in an outdoor envelope data collection mode and, in step 742, the user may be instructed regarding outdoor data collection. For example, camera(s) 180 may be placed in a wide-angle mode and the user may be directed to capture images of doors, windows, and other features/structural elements that may also be visible indoors. As another example, the user may be directed to capture images of any roof overhangs, such that they may be subtracted from roof dimensions in the process of establishing a building perimeter from a combination of overhead imagery of the roof structure and photographs of the overhangs from the underside. It should be appreciated that overhangs may be the same on all sides of a building, but not always. Thus, models may assume a single observed overhang is the same around the entire perimeter and then correct this assumption later during the map determination process. Likewise, several estimates of the roof overhang may be made and averaged along a single exterior wall. Thus, it is important to keep track of not only the estimate of the overhang length and the roof pitch, but also how well these parameters are known, in the form of an uncertainty parameter.

In step 745, the user may be provided feedback regarding the trajectory to be followed. For example, the user of UE 100 may be asked to follow a continuous trajectory to obtain a view of the structure from all sides, while maintaining an optimal distance and/or view of the structure. In some embodiments, the user may be directed to capture images of nearby structures, landmarks etc while keeping the outdoor structure being mapped in view. The user may also be asked to point the camera such that entire edges, such as the full extent of a building corner, the full length of an eave or foundation wall, the full length of the edge between wall and ceiling, etc. may be seen at once. The user may be asked to circumnavigate the perimeter of a building or city block, for example, and return to their starting point to close the loop of the inertial navigation and confirm that the trajectory was precisely tracked for the entirety of the loop. The user may be asked to back-track if the lock on too many satellites was lost or IMU calibration compromised for more than a brief period of time, to reacquire the trajectory using visual means, assure lock has been regained and then continue on the route.

In step 747, if the image capture and measurement process for the outdoor envelope determination is incomplete, then, another iteration may be commenced in step 740. For example, the user may be asked to repeat trajectory 410 to maximize carrier phase continuity and/or to avoid specific difficult multipath locations while still maintaining a good visual view of the structure. The satellite locations in the sky may be displayed to the user, with a representation of when lock is lost and/or regained, to provide the user with rapid feedback for how they are holding the device and maintaining lock.

In step 750, UE 100 may be placed in an indoor data collection mode and, in step 752, the user may be instructed regarding indoor data collection. For example, the user may be directed to capture images of various indoor features, including signs, doors, windows, edges, corners, or other unique features etc. If these features are also visible externally, they may be used to align or register an indoor model of the structure to an external envelope of the structure. In some embodiments, the user may be directed to traverse the indoor area using a series of closed loops to minimize the effect of inertial sensor errors. In another embodiment, a right (or left) hand rule, instructing the user to turn right (or left) at every intersection and/or after some measured distance may be used to form closed loops and assure complete coverage of the structure. Further, the user may be directed to record images of wall widths at door and window jambs. Further, measurements by the altimeter, barometer etc may be used to determine altitude and measurements by the magnetometer may be used to obtain a direction of travel of UE 100, which may be used in addition to and/or to supplement measurements by IMU 170. In some instances, the user may be instructed to obtain pictures of the wireless AP(s) when possible, from multiple angles. In some embodiments, object detection may be performed on the AP to get manufacturer and perhaps even model number, and associated known model-specific characteristics, as well as to determine the AP relative and/or absolute location.

In step 755, the user may be provided feedback regarding the indoor data collection process. For example, the user may be provided with an indication if one or more captured images lack features and/or if an image and/or if one or more images are feature rich. Further, in instances where one or more APs are available, RF measurements including Round Trip Time (RTT) and/or Received Signal Strength Indicators (RSSI) or heat maps may be used to characterize the APs. In some embodiments, in mapping mode, UE 100 may keep track of signal strength, accuracy and/or availability for GNSS and WAN signals and may infer RF permeability for roof, walls, windows and doors for inclusion in map data. In addition, the application may infer body blockage from the antenna pattern 739 to determine whether each measured RF signal goes through user body or not.

In step 757, if the image capture and measurement process for the indoor envelope determination is incomplete or determined to be inadequate, then, another iteration may be commenced in step 750. For example, the user may be asked to repeat the indoor data collection.

In step 760, the measurements and images collected may be processed to obtain map data 763. In some embodiments, step 760 may be performed offline on a server such as server 250. For example, UE 100 may transmit the collected measurements and images to server 250. For example, sever 250 may be a Base Station Almanac (BSA) server and/or another location server, which may process and/or aggregate the measurements/images with data received from other mobile stations. In some embodiments, the sensor/RF/SPS/measurements may be correlated to the captured images to obtain map data 763.

In step 770, one or more maps 773 may be generated based on map data 763. In some embodiments, existing maps may be updated based on map data 763 to obtain maps 773. In some embodiments, maps 773 may be organized as layers at differing levels of UE position granularity.

In step 780, the user may be prompted to end the mapping mode or repeat one or more steps in method 700. In some embodiments, a summary of map data 763 and/or the data collected may be shown to the user, when the user is prompted to end mapping mode. Based on the user input, mapping mode may terminate in step 785 and/or one more steps in method 700 may be repeated.

Figure 9:
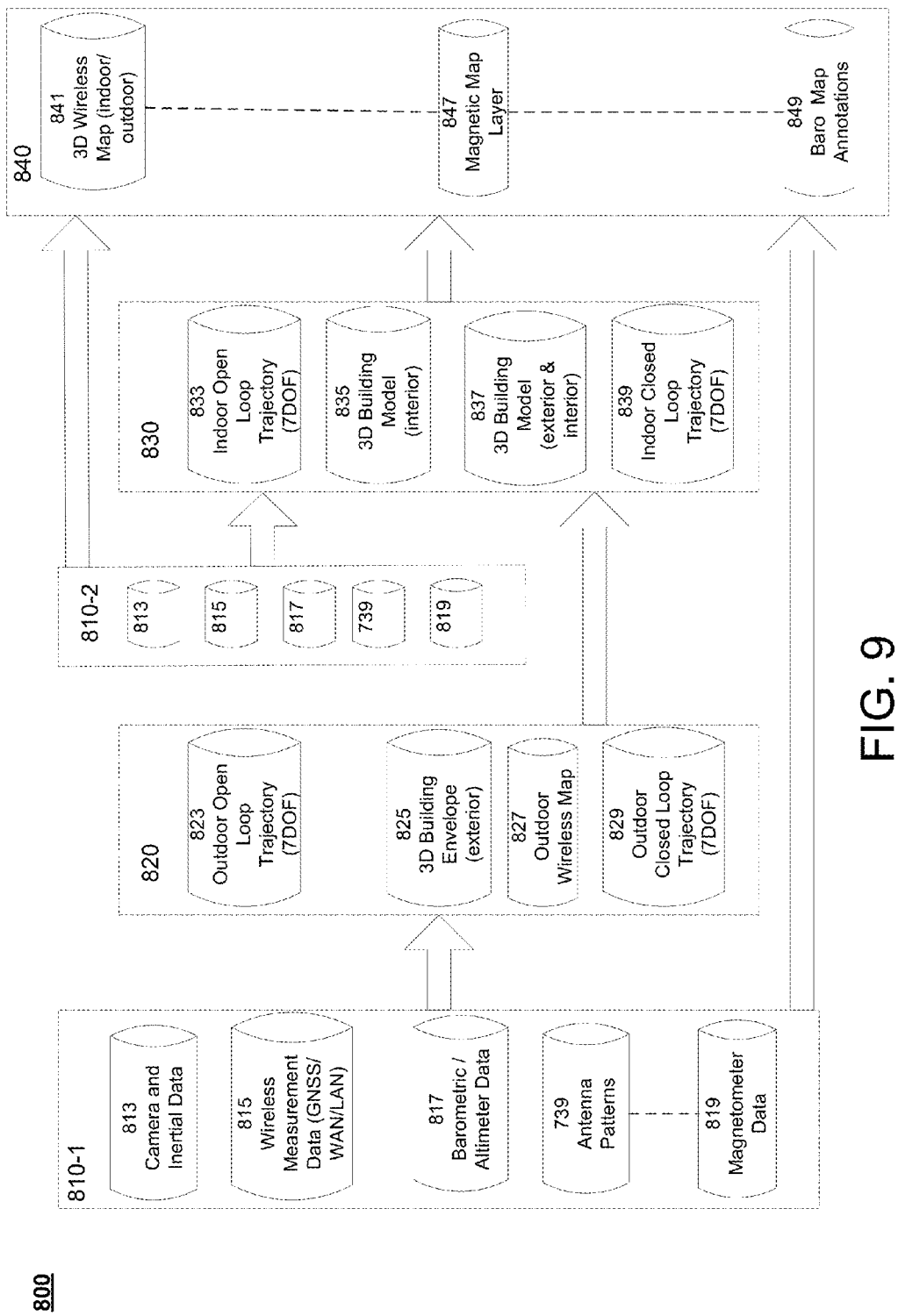
FIG. 9 shows an exemplary high level data flow during hybrid photo mapping.

FIG. 9 shows an exemplary high level data flow 800 during hybrid photo mapping. In some embodiments, during an outdoor data collection phase 810-1, one or more of Camera and Inertial Data 813, Wireless Measurement Data 815, which may include GNSS, WAN and LAN measurements, Barometric or Altimeter data 817, Antenna Pattern 739, and Magnetometer data 819 may be collected.

In outdoor data processing phase 820, data collected in outdoor data collection phase 810-1 may be used to obtain Outdoor Open Loop Trajectory 823, which may then be used to obtain an exterior 3D building envelope 825, Outdoor Wireless Map 827 and Outdoor Closed Loop Trajectory 829.

In some embodiments, during an indoor data collection phase 810-2, one or more of Camera and Inertial Data 813, Wireless Measurement Data 815, which may include GNSS, WAN and LAN measurements, Barometric or Altimeter data 817, Antenna Pattern 739, and Magnetometer data 819 may be collected indoors.

In indoor data processing phase 830, exterior 3D building envelope 825, Outdoor Wireless Map 829 and Outdoor Closed Loop Trajectory 827 may be used along with data collected in 810-1 to obtain to obtain Indoor Open Loop Trajectory 833, which may then be used to obtain an interior 3D building model 835. Interior 3D building model may be registered with exterior 3D building envelope 825 to obtain a first interior and exterior 3D building model 837, which may used with camera and inertial data to obtain Indoor Closed Loop Trajectory 839.

In a map generation phase 840, some or all of the data collected outdoors and indoors in data collection phases 810-1 and 810-2, respectively, may be used along Indoor Closed Loop Trajectory 839 to update interior and exterior 3D building model 837 and to generate various maps. For example, indoor and outdoor 3D wireless map, magnetic map layer, barometric annotations, etc. may be obtained.

Barometric pressure typically follows a standard adiabatic lapse rate as height within the building changes. However, some buildings or portions of buildings may be pressurized. Any deviations from the standard adiabatic lapse rate may be inferred to be as a result of building pressurization. Those deviations, as well as any uncertainty in the deviations, may be noted as barometric annotations to the map. For example, "Barometric pressure observed to be X MM Hg higher than adiabatic lapse rate would predict from floor 24 to 36.

Figure 10A:
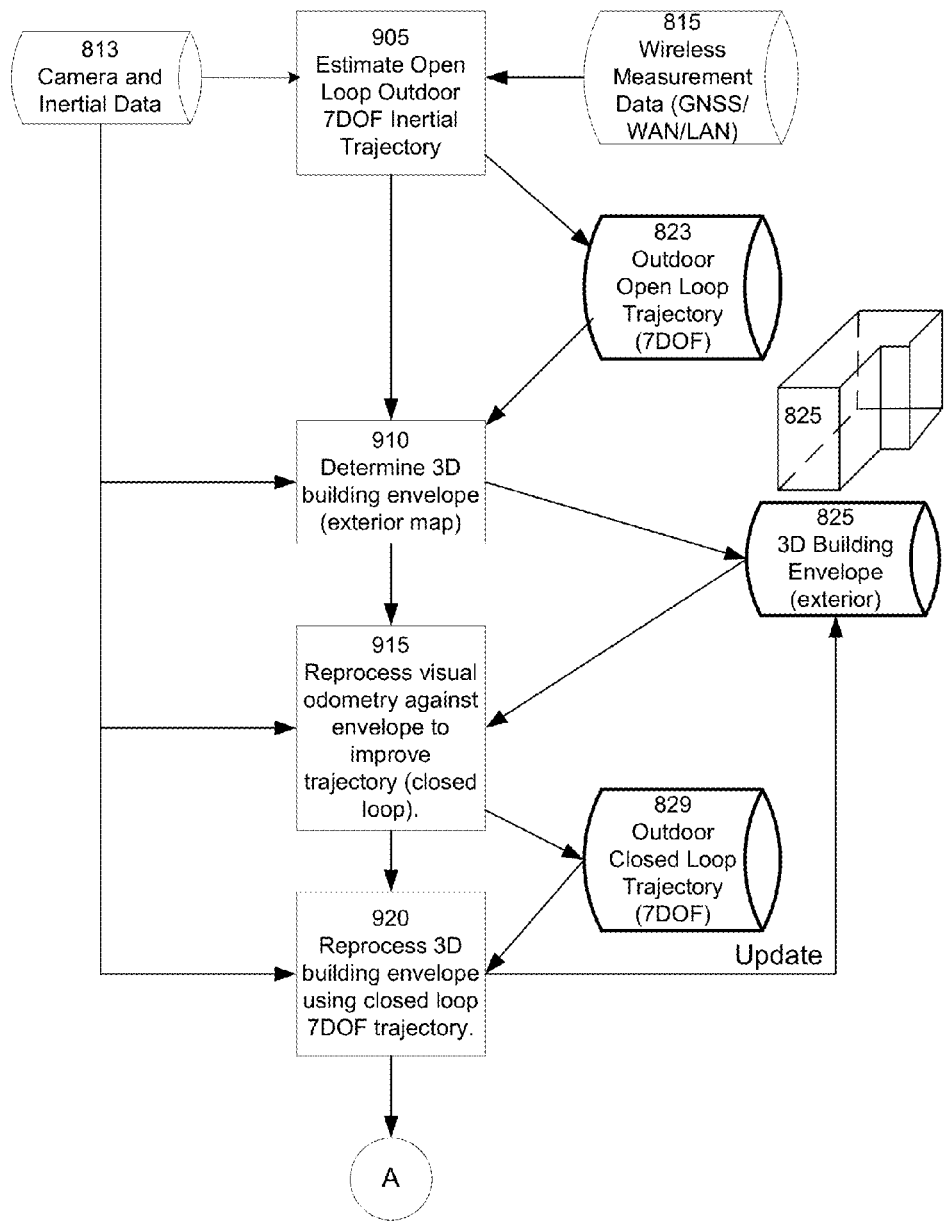
FIGS. 10A-10C shows a flowchart illustrating a method for map generation based on Photo, Wireless, Magnetic, and Barometric data.

FIG. 10A shows a flowchart illustrating a method 900 for map generation based on Photo, Wireless, Magnetic, and Barometric data. In some embodiments, portions of method 900 may be performed by UE 100 and/or server 250. In some embodiments, prior to invocation of method 900 or during an initialization step, UE 100 may capture various measurements by entering a mapping mode. For example, in mapping mode UE 100 may collect continuous GNSS, camera and inertial data and other sensor data at a relatively high rate. Further, in mapping mode, sensory measurements such as RF measurements, GNSS measurements and data from inertial, magnetometer, altimeter, and/or barometric sensors may be captured in conjunction with the capture of images.

In step 905, outdoor 7-DOF open loop trajectory 823 of the UE may be determined based on the camera and inertial data 813 and wireless measurement data 815. For example, a combination of SPS/GNSS/LAN/WAN measurements, IMU 170 measurements and images captured by camera(s) 180 may be used to determine the 7-DOF trajectory of UE 100. For example, inertial stitching may be used when inertial trajectory drift is less than some threshold (e.g. less than half a GPS L1 wavelength).

In step 910, in some embodiments, the exterior 3D building envelope 825 may be obtained based on outdoor 7-DOF open loop trajectory 823.

In step 915, outdoor 7-DOF closed loop trajectory 829 may be obtained by reprocessing visual odometry against exterior 3D building envelope 825. For example, where LOS conditions exist to more than one satellite thereby permitting simultaneous multiple carrier phase observations the inertial trajectory may be stabilized by returning to visual feature(s) that were previously photographed during the data collection and gyro and accelerometer errors may be modeled such that the trajectory (is re-estimated to return to the visual feature(s) with no apparent errors. In some embodiments, MW assumptions may be used in determination of exterior 3D building envelope 825. Then, the trajectory of UE 100 may be re-calculated from the visual odometry data against this adjusted 3D photo model to obtain outdoor 7-DOF closed loop trajectory 829. Next, in step 920, the 3D building envelope 825 may be updated and/or reprocessed based on 7-DOF closed loop trajectory 829.

Figure 10B:
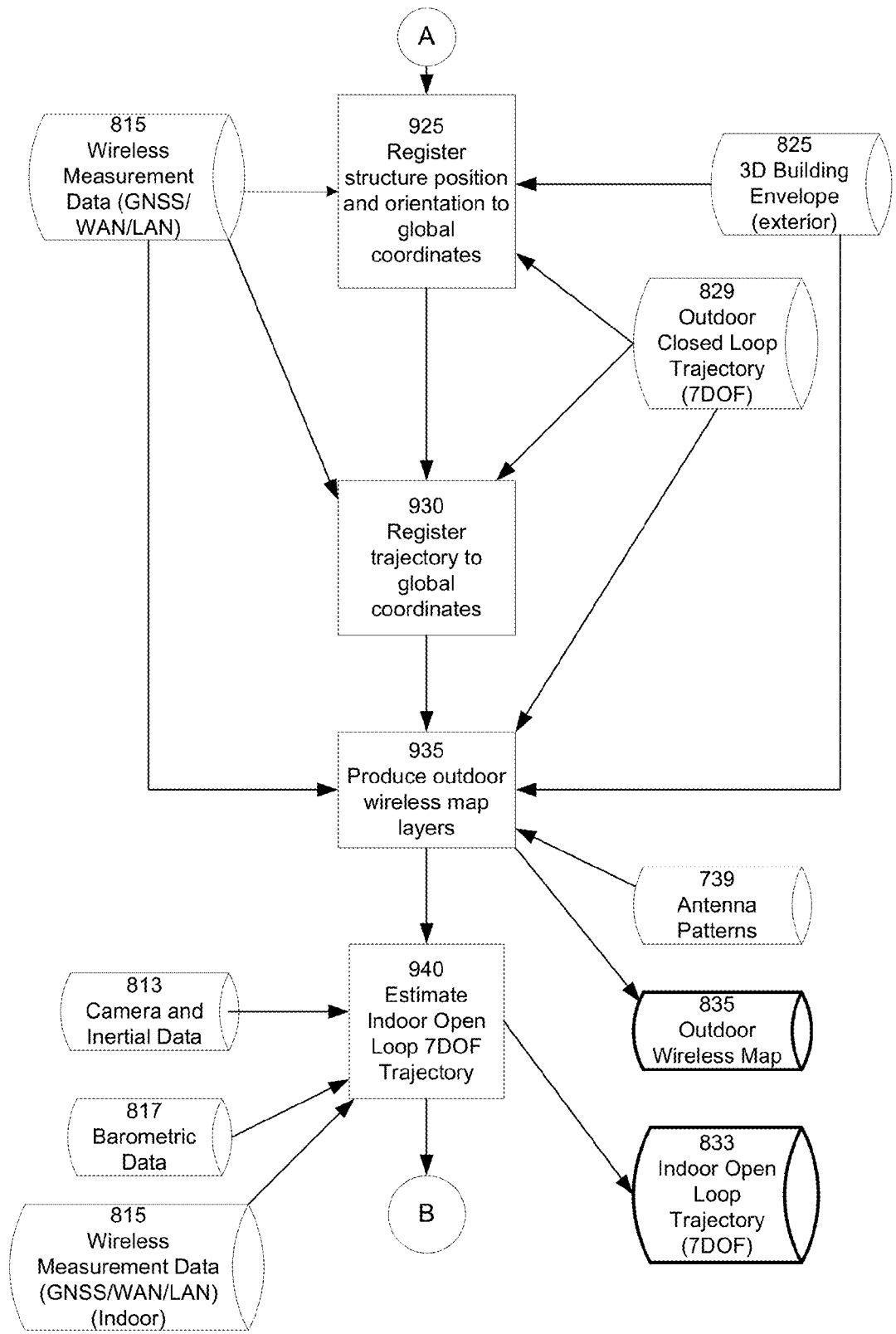

Referring to FIG. 10B, in some embodiments, in step 925, the position and orientation of the building may also be registered to global coordinates, in part, by using updated 3D building envelope 825 and wireless measurements 815. In step 930, outdoor 7-DOF closed loop trajectory 829 may then be registered to global coordinates.

In some embodiments, in step 930, antenna patterns 739, updated 3D building envelope 825 and wireless measurements 815 may also be used to generate and/or update one or more existing outdoor wireless map(s) 835. In some embodiments, outdoor wireless map(s) 835 may be generated and/or stored on server 250. These maps may include one or more of an outdoor 2D road map or floor plan, a photo map, which may include 3D navigable feature database, a heat map, which may indicate signal strengths for one or more antennas at various locations, and/or a spatially variable FLC map, which may indicate signal delays for an antenna at various locations. In some embodiments, one or more of the maps may be stored as layers at differing levels of position granularity.

In step 940, an indoor 7-DOF loop trajectory 833 may be estimated based on the camera and inertial data 813, indoor wireless measurement data 815, and barometric and/or altimeter data 817. For example, a combination of SPS/GNSS/LAN/WAN measurements, IMU 170 measurements and images captured by camera(s) 180 may be used to determine the 7-DOF trajectory of UE 100. In the event of wireless signal outages, camera and inertial data 813 may be used to stitch together measurements to obtain a trajectory. In some embodiments, indoor 7-DOF loop trajectory 833 may be estimated based on the camera and inertial data 813, and barometric and/or altimeter data 817 without reference to indoor wireless measurement data 815 because indoor measurements may be unavailable and/or affected significantly by multipath.

Figure 10C:
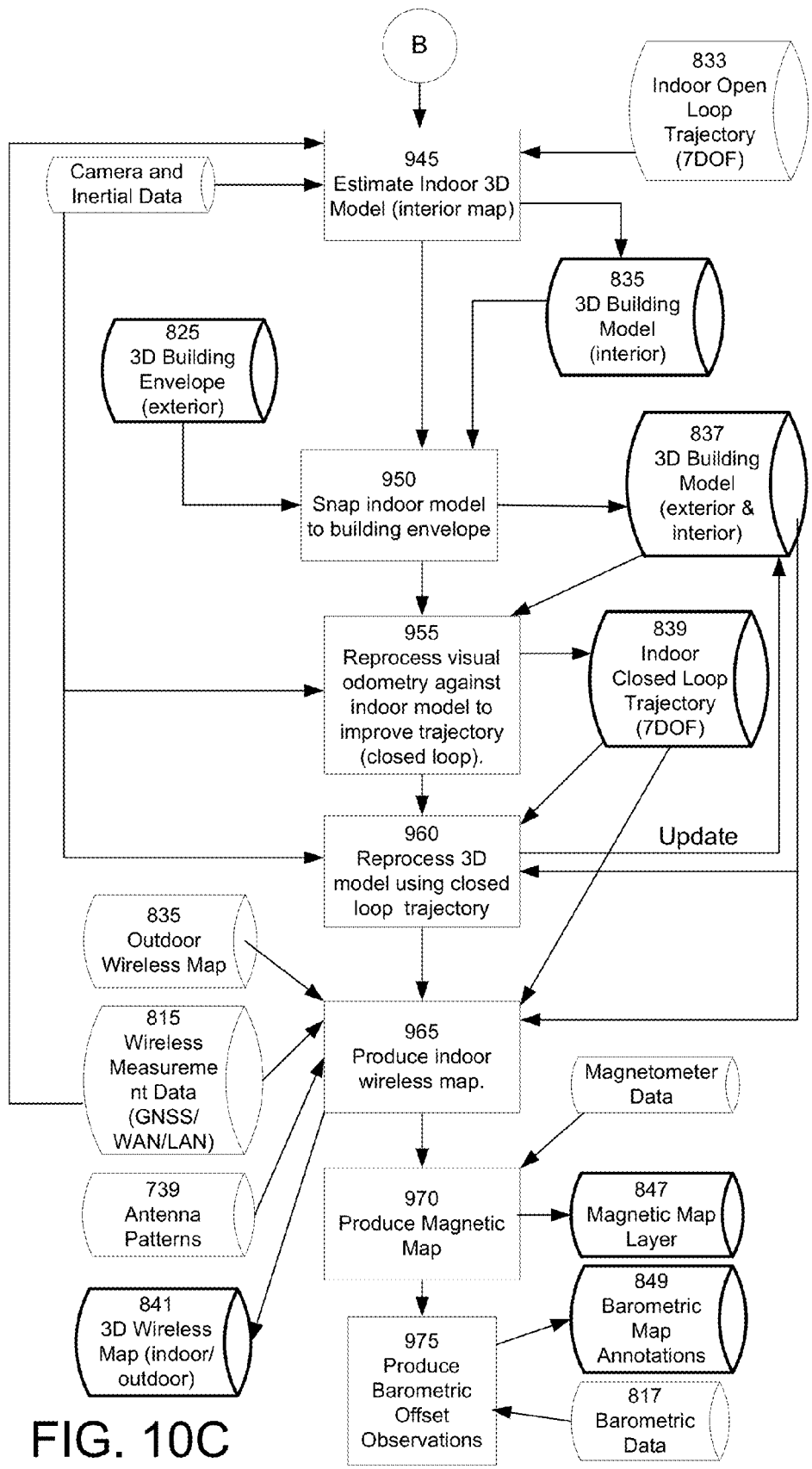

In FIG. 10C, in step 945, interior 3D building model 835 and/or a map of the indoor area may be generated from camera and inertial data 813, indoor wireless measurement data 815, and indoor 7-DOF loop trajectory 833. For example, altimeter, magnetometer, barometric and IMU measurements may be used, in part, along with image data to generate the indoor maps. In some embodiments, MW assumptions may be used to reconstruct a 3D model of the indoor area from the captured images. For example, CVM 155 may be used to perform the reconstruction and/or the reconstruction may be performed offline by server 250. In embodiments, where a depth sensor is available on UE 100, the depth data provided may be used to reconstruct indoor areas. Further, in instances where indoor wireless measurement data 815 includes data for one or more APs, RF measurements including Round Trip Time (RTT) and/or Received Signal Strength Indicators (RSSI) may be used to characterize the APs such as APs 620-1 and 620-2 (in FIG. 7A).

In step 950, interior and exterior 3D building model 837 may be obtained from 3D interior building model 835, in part, by registering/aligning 3D interior building model 835 with exterior 3D building envelope 825. In some embodiments, structural features such as windows, doors etc., which may be visible both internally and externally, may be used when registering images to an external map. In some embodiments, each room or appropriate indoor structural unit may be resolved individually, and then snapped to the external envelope.

In step 955, in some embodiments, an indoor 7-DOF closed loop trajectory 839 may be determined by reprocessing visual odometry against interior and exterior 3D building model 837. For example, by returning to visual feature(s) that were previously photographed during the data collection errors in IMU 170 may be compensated and the trajectory may be re-estimated to return to the visual feature(s) with no apparent errors.

In step 960, 3D model building model 837 may then be reprocessed/updated based on indoor 7-DOF closed loop trajectory 839 and inertial and camera data 813. In some embodiments, in step 960, an indoor map may then be generated based on the 3D model.

In step 965, 3D indoor/outdoor wireless map 841 may be obtained based on outdoor wireless map 835, wireless measurement data 815, antenna patterns 739 and 3D model building model 837.

In step 970, magnetometer data 819 may be used to produce magnetic map layer 847, and in step 975, barometric data 817 may be used to produce barometric map annotations.

In some embodiments, all or part of the collected data may be processed on the UE 100 and/or sent to a server 250 for processing. In some embodiments, if maps are available for neighboring and/or attached structures, the indoor/outdoor maps for the current structure and the attached/neighboring structures may be stitched together, for example, by using exterior images. In some embodiments, pointers/associations to nearby structure maps may be cached in the UE, and/or on the server. In some embodiments, where a "smart glass" or other wearable device is coupled to the phone such as a Bluetooth headset with a camera, the camera on the smartglass/wearable device may be triggered.

Figure 11:
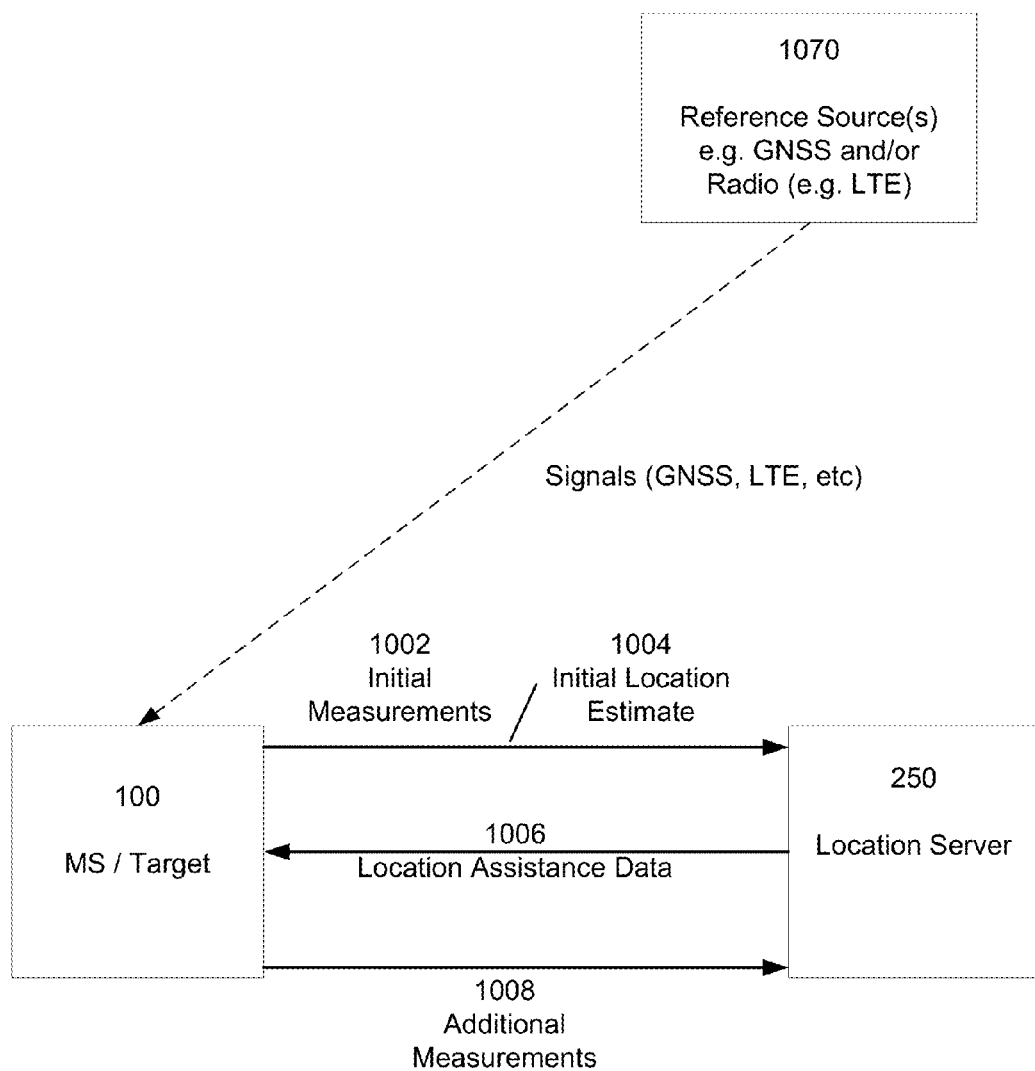
FIG. 11 shows a simplified block diagram illustrating some entities in a system capable of determining the location of an MS.

FIG. 11 shows a simplified block diagram illustrating some entities in a system 1000 capable of determining the location of UE 100. In some embodiments, system 1000 may form part of a UE assisted positioning system. Referring to FIG. 10, UE 100 may measure signals from reference source(s) 1070 to obtain initial measurements 1002 and/or initial location estimate 1004. Reference source(s) 1070 may represent signals from SVs 280 and/or antennas 240 and/or APs 620 associated with network 230. UE 100 may also obtain initial measurements 1002 such as, for example, pseudo-range measurements for SVs 280 and/or OTDOA/RSTD related measurements from antennas 240.

In some instances, UE 100 may also obtain an initial location estimate 1004 by using initial measurements 1002. Initial location estimate 1004, which is sometimes termed a "prefix", may be a coarse estimate of the position of UE 100. In some instances, range measurements by UE 100 may be used to obtain initial location estimate 1004. In some instances, a location associated with the serving cell, or the strongest cell, or the earliest cell, or another cell may be used as initial location estimate 1004. For example, the centroid of the serving cell, or the strongest cell, or the earliest cell, or some other cell may be used as initial location estimate 1004. As a further example, a random or default starting location within a cell may be used as initial location estimate 1004. Cell related information may be obtained from the Cell Sector Identity, Network ID, System ID, and other information transmitted by the base station. UE 100 may provide initial location estimate 1004 and/or initial measurements 1002 (e.g., satellite measurements from one or more GNSSs, or network measurements such as OTDOAs and/or RSTDs from one or more networks, etc.) to server 250. In some situations, UE 100 may not determine initial location estimate 1004, instead, initial measurements 1002 taken by UE 100 may be sent to server 250, which may use initial measurements 1002 to determine initial location estimate 1004 for UE 100.

Server 250 may provide then provide location related information based on initial location estimate 1004, such as location assistance data 1006 to UE 100. In some embodiments, the location assistance data may be received by one or more of LDAM 158, MM 152, PDM 156, and/or NM 154 and may be used to assist UE 100 in acquiring and measuring signals from SVs 280 and/or antennas 240, and/or in refining any initial location estimate 1004 obtained from measurements 1002. In some embodiments, the location assistance data may include map layers and/or other information at a granularity tailored to initial location estimate 1004 and a position uncertainty associated with initial location estimate 1004.

For example, UE 100, which in some instances may take the form of a Secure User Plane (SUPL) Enabled Terminal (SET), may communicate with server 250 and use location assistance data 1006 obtain additional measurements 1008. In some embodiments, additional measurements 1008 may comprise various FLC related measurements and/or Pilot Phase measurements, Time of Arrival, RSTD/OTDOA measurements, measurements related to time offsets of base station antennas, GPS (e.g. pseudorange) measurements, etc. In some instances, in response to the receipt of location assistance data or lack thereof, UE 100 may enter mapping mode and capture additional measurements 1008, which may include measurements from camera(s) 180, IMU 170, sensors 185 and other wireless (GNSS/WAN/LAN) signal measurements as outlined above. In some embodiments, UE 100 may send additional measurements 208 to server 250 or another PDE over network 230 and/or store the measurements in memory 130.

In some embodiments, server 250, UE 100, or another PDE may use additional measurements 208 to obtain a refined location for UE 100. In some embodiments, UE 100 may use additional measurements 1008 to directly obtain a refined location estimate. Further, in some embodiments, the refined location estimate for UE 100 may be communicated to LCS Client 260. When the position/position uncertainty of UE 100 is refined or re-estimated based on the previously provided location assistance information, FLC values and/or other information based on the refined position estimate/position uncertainty may be retrieved from another map layer to facilitate a more accurate determination of UE position. In general, position location may be MS-assisted, where UE 100 sends back raw or pre-processed measurement data through the base station to a PDE in the network for use in position determination; or, MS-based, where the position computation is performed by UE 100.

Wireless communication systems that provide position determination services, typically store and/or aggregate calibration information and other measurements used for location determination in one or more databases, such as a Base Station Almanac (BSA) database, a map database, etc. For example, the databases may include maps with map layers, which may include various other types of information.

For example, map layers may include one or more of: a received signal strength map layer that correlates a received signal strength with map locations; a Signal to Noise Ratio (SNR) map layer correlating SNRs with map locations; a Line of Sight (LOS) map layer indicating map locations where LOS conditions are likely with respect to one or more antennas; a Non-Line of Sight map layer, the NLOS map layer indicating map locations where NLOS or body blocked conditions are likely with respect to one or more antennas, etc. In some embodiments, the map layers may also include at least one multipath layer to provide an indication of the extent of multipath for the antenna for locations in the BSA. Further, in one embodiment, the multipath layer may further comprise at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna.

In some embodiments, UE 100 may use information in one or more map layers to estimate a location and location uncertainty, and based on the location and location uncertainty may request or retrieve additional map layers. In some embodiments, a plurality of map layers may be provided to UE 100 based on the location/location uncertainty of UE 100. In general, location assistance information comprising map layers may be provided to UE 100 based on protocols used for communication with UE 100, available bandwidth for communication, signal conditions, cost, communication, memory and/or processing capability available at UE 100 and various other parameters.

In some embodiments, each region on a map may be identified by the coordinates (e.g. latitude, longitude, altitude) of one or more boundary points, which may be dependent on the granularity of the map layer. Accordingly, in these embodiments, measurements pertaining to points within a region may be aggregated and associated with the region. Some or all of the hierarchy of aggregated measurements and related data may be provided to UE 100 based on its position/position uncertainty.

The BSA database may store/aggregate calibration and other base station related information. The BSA record for a base station may specify the base station identification information, the position (e.g. altitude, latitude and longitude) of the base station antenna(s), FLC values at a position for an antenna, antenna orientation, range, repeater information, etc. The term "FLC value" as used herein may refer to both FLC values and FLC residuals. FLC residuals may be specified in distance units (e.g. meters), while FLC values may be specified in time units (e.g. seconds). In some embodiments, the BSA may also include information such as the center of a base station sector coverage area, the maximum range of the base station signals, the average terrain height over one or more coverage area(s)/sub-area(s), the terrain height standard deviation over the one or more coverage area(s)/sub-area(s), round-trip delay (RTD) calibration information, pseudo-random noise (PN) increments in CDMA systems, uncertainty in the base station antenna position, uncertainty in the forward-link delay calibration, and uncertainty in the round-trip delay calibration.

In some embodiments, a system to facilitate terrestrial positioning system calibration may aggregate additional measurements 1008, including FLC related measurements and refined position estimates by a plurality of mobile stations/PDEs. In some embodiments, measurements in mapping mode by each of the plurality of mobile stations may be aggregated and stored on a server and statistical significance may be derived based on the aggregation. For example, a standard deviation, variance, mean, median and other statistical measures may be derived from the aggregation. In some embodiments, measurements taken by a UE 100 may be used to replace measurements in the database. For example, if visual images and/or other measurements indicate that the interior of a structure has changed relative to a stored 3D building model 837, then stored building model 837 may be updated and/or replaced with a new building model based on the more recent measurements. Similarly, one or more of exterior 3D building envelope 825, 3D wireless map 841, magnetic map layer 847 and/or barometric map annotations 849, and/or other map layers may be updated based on new measurements. Thus, UE 100 may both receive location assistance data 1006 in the form of information in the database(s) and additional measurements 1008 captured by UE 100 in mapping mode may be used to update the existing database(s).

For example, refined location estimate(s) associated with UE 100 and measurements (including images captured) by UE 100 at those location(s) may be associated and/or aggregated with measurements by other mobile stations for the same location and/or for a region in the vicinity of that location based on the granularity of the information stored in the database. In some embodiments, one or more of the captured images may be stored as keyframes or reference frames along with an estimated camera pose(s) associate with the keyframe image(s). In some embodiments, exterior and interior 3D model 837 may include keyframes.

In some embodiments, the refined position estimate may be associated with the aggregated measurements based on a quality threshold associated with the position fix. For example, a "Horizontal Estimated Position Error" (HEPE) quality measure, which represents an estimate of the error associated with each location fix, may be used to determine which measurements are added and/or aggregated to the BSA database. For example, measurements associated with position fixes with a HEPE value of less than some specified threshold depending on the desired accuracy or position granularity—may be added and/or aggregated with the database(s).

In some embodiments, a base station almanac database may be configured initially with default, average or estimated FLC values and with reasonably accurate antenna positions. In some embodiments, existing BSAs may be used and updated based on the plurality of additional measurements 208 received from the plurality of UE's 120 and/or PDEs. Based on repeated measurements made by the plurality of MS'120/PDEs, the antenna position estimates and spatially-variable FLC values will continually improve over time leading to greater antenna position certainty, which may be used to improve the forward link calibration accuracy.

In some embodiments, server 250 may aggregate raw measurement information from a crowd of mobiles to create statistically significant maps with information at different granularities associated with the measurements. In some embodiments, server 250 may perform some or all of the functions of a BSA, map, and/or location server. For example, server 250 may collect and format location data, generate and update maps or models, may provide assistance to mobile stations for position estimation, and/or may perform computations to obtain position estimates for the mobile stations. In some embodiments, server 250 may comprise a BSA server, which may manage a BSA database that stores a complete BSA.

Embodiments disclosed, for example, including the crowd sourcing of photographic and other measurements from a plurality of mobile stations/PDEs, may provide continuously maintained map data including indoor maps and reduce or remove the need for resource intensive field work. In some embodiments, a high sampling rate may be maintained throughout the network because of frequent crowd sourced sampling by publicly owned mobile devices. In some embodiments, the crowd sourced measurement may be used to build and/or update the database(s)/BSA.

Because the sampling rate, statistical significance, and accuracy of information are proportional to user density at a location, popular locations, which have higher user density, will be calibrated frequently. Accordingly, such crowd based calibration systems may optimize themselves to where users are located and/or where location services are repeatedly used. In contrast, existing systems are typically calibrated based on some metric of network geometry or signal propagation models, which may not reflect usage patterns. Further, popular locations that are frequented by mobile station users will also tend to have up to date, statistically significant, and accurate information. In addition, during the deployment of a system consistent with embodiments disclosed herein, FLC information for popular locations may be quickly obtained based on more frequent gathered measurements thereby facilitating deployment.

In some embodiments, photographic data and measurements may also be collected and/or supplemented by "wardriving". In wardriving, a user may capture images, take sensor measurements and take measurements of wireless signals, which may be correlated with UE position to obtain maps. The collected measurements may be aggregated with and/or used to supplement and/or replace measurements stored in databases and/or to update existing maps. In some embodiments, UE users, (e.g. users that are near a location or route where measurements/mapping is desired) may be incentivized to travel to the location and/or take a specified route. For example, a reward in the form of a cash reward, rebate, free airtime, or incentives targeted to establishments near the desired location or along the route may be used as incentives. In some embodiments, user consent may be obtained to install an application on a smartphone that may report measurements periodically to server 250.

In some embodiments, information in maps provided to UE 100 may include an indication of one or more of: the likelihood of detection of a signal, the likely accuracy of the signal at estimated position of UE 100 along with an estimate of the initial position uncertainty of UE 100. Further, in some embodiments, the maps provided to UE 100 may also include an indication of one or more of: the likelihood of LOS conditions, the lack of long multipath conditions, and/or a determination of whether UE 100 lies in a long or short shadow region. The maps may include simple annotations such as eNodeB antenna location, antenna pattern and output power, such that the mobile may perform a simple link analysis with a first order model. Further, the map may contain differences between this first order model and a more localized model, containing higher order correction terms.

Figure 12:
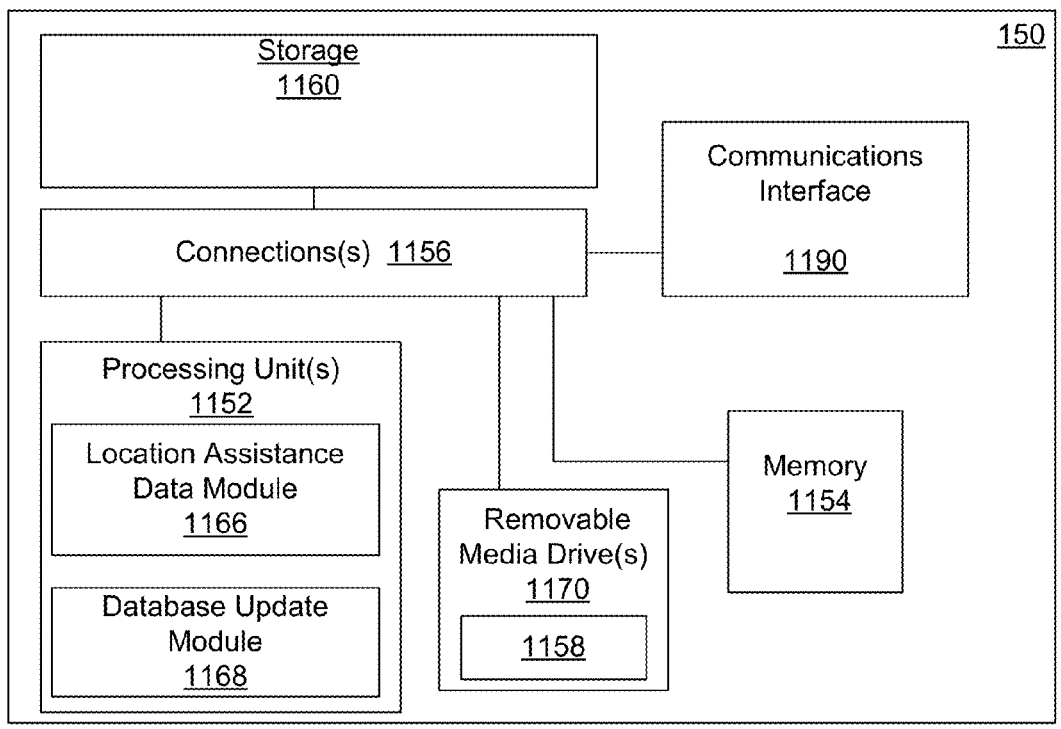
FIG. 12 shows a schematic block diagram illustrating a server enabled to support enabled to support position determination and crowdsourced map generation and navigation.

Reference is now made to FIG. 12, which is a schematic block diagram illustrating a server 250 enabled to support enabled to support hybrid photo mapping and navigation. In some embodiments, server 250 may also provide support for position determination and crowdsourced map generation and navigation. In some embodiments, server 250 may support location determination by providing location assistance information including layered maps in a manner consistent with disclosed embodiments. Further, in some embodiments server 250 may update databases (e.g. a BSA, map, and/or a configuration database) based on measurements and information reported by one or more UE's 100 in a manner consistent with disclosed embodiments. In some embodiments, server 250 may include, for example, one or more processing units 1152, memory 1154, storage 1160, and (as applicable) communications interface 1190 (e.g., wireline or wireless network interface), which may be operatively coupled with one or more connections 1156 (e.g., buses, lines, fibers, links, etc.). In certain example implementations, some portion of server 250 may take the form of a chipset, and/or the like.

Communications interface 1190 may include a variety of wired and wireless connections that support wired transmission and/or reception and, if desired, may additionally or alternatively support transmission and reception of one or more signals over one or more types of wireless communication networks. Communications interface 1190 may also include interfaces for communication with various other computers and peripherals. For example, in one embodiment, Communications interface 1190 may comprise network interface cards, input-output cards, chips and/or ASICs that implement one or more of the communication functions performed by server 250. In some embodiments, communications interface 1190 may also interface with network 230 to obtain a variety of network configuration related information, such as PCIs, configured PRS information, and/or timing information used by the base stations in the network. For example, Communications interface 1190 may make use of the LPP annex (LPPa) protocol defined in 3GPP TS 36.455 or a modification of this protocol to obtain PCI, configured PRS, timing and/or other information from the base stations in network 230. Processing unit 1152 may use some or all of the received information to generate location assistance data in a manner consistent with disclosed embodiments.

Processing unit 1152 may be implemented using a combination of hardware, firmware, and software. In some embodiments, processing unit 1152 may include Server Location Assistance Data Module 1166, which may generate location assistance information, including layered maps, with multipath and visibility information, spatially variable FLC data, PRS timing and muting assistance information, etc. for transmission to mobile stations 100. In some embodiments, Server Location Assistance Data Module 1166 may also generate location assistance information for transmission to mobile stations 100. Processing unit 1152 may also be capable of processing various other LPP/LPPe assistance information either directly or in conjunction with one or more other functional blocks shown in FIG. 11. In some embodiments, processing unit 1152 may generate the location assistance information as Long Term Evolution (LTE) Positioning Protocol (LPP) or LPP extensions (LPPe) messages.

Figure 13:
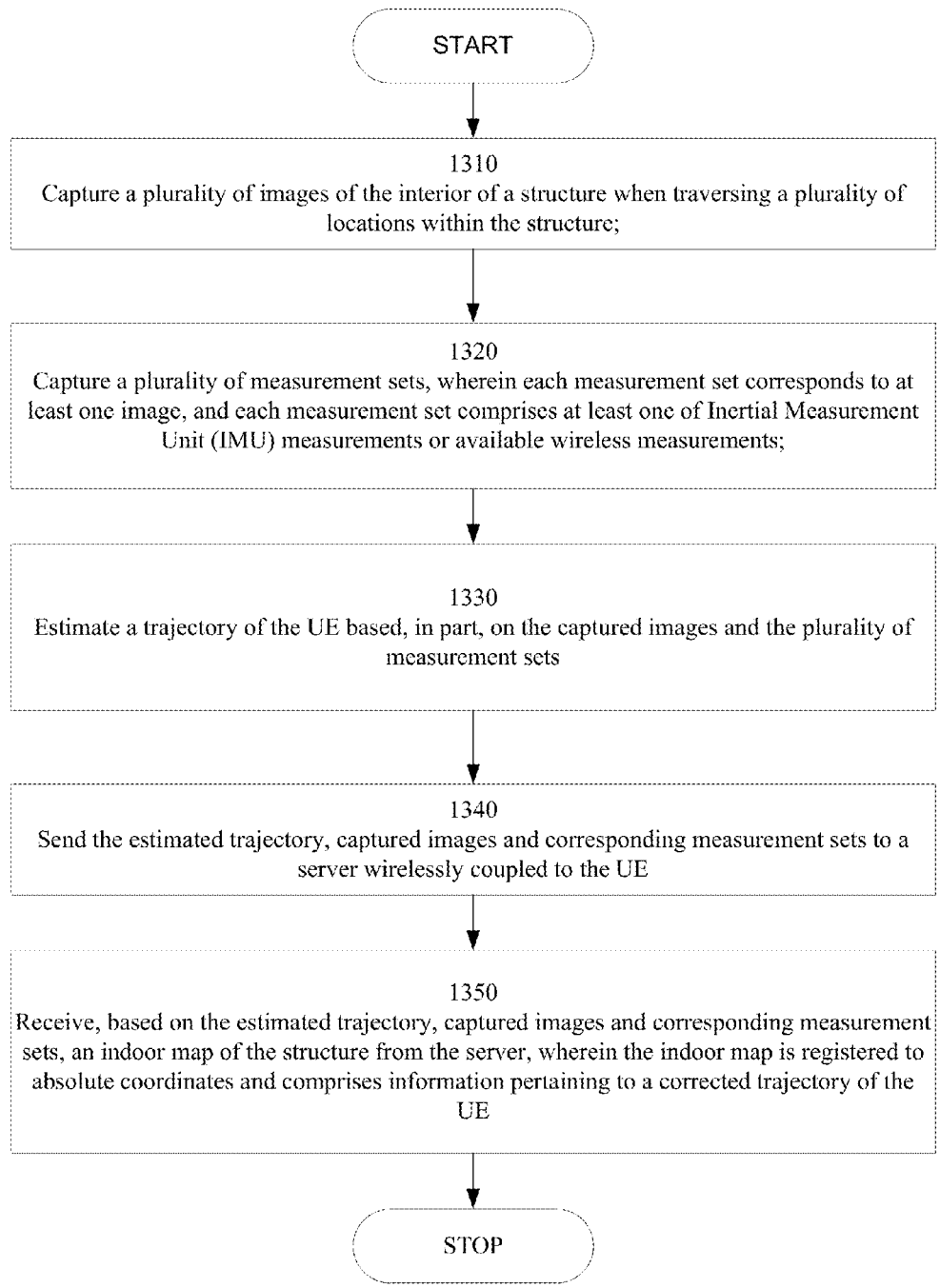
FIG. 13 shows a flowchart of an exemplary method of hybrid photo mapping consistent with disclosed embodiments.

FIG. 13 shows a flowchart 1300 of an exemplary method of hybrid photo mapping consistent with disclosed embodiments. In some embodiments, method 1300 may be performed by a UE; and/or a server wirelessly coupled to a UE. In some embodiments, method 1300 may be performed by a mapping application on the UE. For example, the mapping application may provide instructions pertaining to the capture of images and/or the trajectory to be followed.

In some embodiments, in step 1310, a plurality of images of the interior of a structure when traversing a plurality of locations within the structure may be captured.

Next, in step 1320, a plurality of measurement sets may be captured, wherein each measurement set corresponds to at least one image, and each measurement set comprises at least one of Inertial Measurement Unit (IMU) measurements or available wireless measurements. In some embodiments, each measurement set may be captured within a short time window of the capture of the corresponding image. In some embodiments, each measurement set further comprises one or more of: barometric measurements; or altimeter measurements; or magnetometer measurements. In some embodiments, the wireless measurements comprise one or more of:

Wireless Wide Area Network (WWAN) measurements comprising one of: Observed Time Difference of Arrival (OTDOA) measurements, or Reference Signal Time Difference (RSTD) measurements, or Advanced Forward Link Trilateralation (AFLT) measurements, or hybrid-AFLT measurements; or Wireless Local Area Network (WLAN) measurements comprising Radio Frequency (RF) measurements of Access Points (APs) signals.

In step 1330, a trajectory traversed by the UE may be estimated based, in part, on the captured images and the plurality of measurement sets. The trajectory may be estimated, for example, by obtaining a position of the UE in absolute coordinates in a vicinity of the structure; and estimating the trajectory based, in part, on the position of the UE obtained in absolute coordinates. In some embodiments, the trajectory of the UE may be estimated by applying Visual Simultaneous Localization and Mapping (VSLAM) techniques to a subset of the plurality of images to determine a corresponding 6 Degrees Of Freedom (6DOF) pose of the UE relative to each image in the subset, the 6DOF pose being determined based on keypoints in the subset of images; and determining, for each image in the subset, a corresponding pose of the UE in absolute coordinates, based in part, on the corresponding 6DOF pose, and the measurement set. In some embodiments, for each image in the subset, the corresponding pose of the UE in absolute coordinates may be determined by providing, the corresponding 6DOF pose and the corresponding measurement set to an Extended Kalman Filter (EKF), and the EKF may determine the corresponding pose of the UE in absolute coordinates based, in part, on the provided information.

In step 1340, the estimated trajectory, captured images and corresponding measurement sets may be sent to a server wirelessly coupled to the UE.

In step 1350, an indoor map of the structure registered to absolute coordinates may be received from the server. The received indoor map may be based on the estimated trajectory, captured images and corresponding measurement sets, and may comprise information pertaining to a corrected trajectory of the UE.

In some embodiments, the indoor map may include a plurality of layers aligned to the absolute coordinates. The plurality of aligned layers may include at least two of: a plan view map, or a 3-dimensional structure model, or annotations for any variations to barometric pressure not predicted by a standard adiabatic lapse rate model, or annotations for any variations to the magnetic field not predicted by a standard Earth magnetic field model, or attenuation or delay of WWAN signals associated with the mapped structure, or annotations for any variation in WWAN signal strength within the structure, or attenuation or delay of WLAN signals associated with the mapped structure, or an indication of WLAN AP locations within the structure, or an indication of WLAN field strengths within the structure, or an indication of WLAN RTT delay calibrations within the structure. In some embodiments, the corrected trajectory of the UE may corresponds to a closed-loop trajectory of the UE, which may be provided in absolute coordinates.

The methodologies described herein in flow charts and message flows may be implemented by various means depending upon the application. For example, these methodologies may be implemented in hardware, firmware, software, or any combination thereof. For a hardware implementation, the processing unit 1152 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A method on a user equipment (UE) comprising:
    capturing a plurality of images of an interior of a structure when traversing a plurality of locations within the structure;
    capturing a plurality of measurement sets, wherein each measurement set corresponds to at least one image in the plurality of images, and each measurement set comprises at least one of Inertial Measurement Unit (IMU) measurements or available wireless measurements;
    estimating a trajectory of the UE based, in part, on the plurality of images and the corresponding plurality of measurement sets;
    sending the estimated trajectory, the plurality of images and corresponding measurement sets to a server wirelessly coupled to the UE; and
    receiving, based on the estimated trajectory, the plurality of images and corresponding plurality of measurement sets, an indoor map of the structure from the server, wherein the indoor map is registered to absolute coordinates and comprises information pertaining to a corrected trajectory of the UE.

2. The method of claim 1, wherein estimating the trajectory of the UE comprises:
    obtaining a position of the UE in absolute coordinates in a vicinity of the structure; and
    estimating the trajectory based, in part, on the position of the UE obtained in absolute coordinates.

3. The method of claim 2, wherein estimating the trajectory of the UE comprises:
    applying Visual Simultaneous Localization and Mapping (VSLAM) techniques to a subset of the plurality of images to determine a corresponding 6 Degrees Of Freedom (6DOF) pose of the UE relative to each image in the subset, the 6DOF pose being determined based on keypoints in the subset of images; and
    determining, for each image in the subset, a corresponding pose of the UE in absolute coordinates, based in part, on the corresponding 6DOF pose, and a corresponding measurement set.

4. The method of claim 3, wherein determining the corresponding pose of the UE in absolute coordinates comprises:
    providing, for each image in the subset, the corresponding 6DOF pose and the corresponding measurement set to an Extended Kalman Filter (EKF), wherein the EKF determines the corresponding pose of the UE in absolute coordinates.

5. The method of claim 1, wherein each measurement set further comprises one or more of:
    barometric measurements; or
    altimeter measurements; or
    magnetometer measurements.

6. The method of claim 5, wherein the indoor map includes a plurality of layers aligned to the absolute coordinates.

7. The method of claim 6, wherein the plurality of aligned layers includes at least two of:
a plan view map, or
a 3-dimensional structure model, or
annotations for any variations to barometric pressure not predicted by a standard adiabatic lapse rate model, or
annotations for any magnetic field variations not predicted by a standard Earth magnetic field model, or
attenuation or delay of WWAN signals associated with the structure, or
annotations for any variation in WWAN signal strength within the structure, or
attenuation or delay of WLAN signals associated with the structure, or
an indication of WLAN AP locations within the structure, or
an indication of WLAN field strengths within the structure, or
an indication of WLAN RTT delay calibrations within the structure.

8. The method of claim 1, wherein the available wireless measurements comprise one or more of:
Wireless Wide Area Network (WWAN) measurements comprising one of:
Observed Time Difference of Arrival (OTDOA) measurements, or
Reference Signal Time Difference (RSTD) measurements, or
Advanced Forward Link Trilateralation (AFLT) measurements, or
hybrid-AFLT measurements; or
Wireless Local Area Network (WLAN) measurements comprising Radio Frequency (RF) measurements of Access Points (APs) signals.

9. The method of claim 1, wherein the corrected trajectory of the UE corresponds to a closed-loop trajectory of the UE.

10. The method of claim 1, wherein the method is performed by a mapping application on the UE, wherein the mapping application provides instructions to the capture the plurality of images.

11. A User Equipment (UE) comprising:
a camera, the camera configured to capture a plurality of images of an interior of a structure when traversing a plurality of locations within the structure;
a plurality of sensors, the plurality of sensors comprising an Inertial Measurement Unit (IMU),
a wireless module, the wireless module configured to take measurements of available wireless signals, and
a processor, the processor coupled to the camera, the plurality of sensors and the wireless module, wherein the processor is configured to:
obtain the plurality of images of the interior of the structure;
obtain a plurality of measurement sets, wherein each measurement set corresponds to at least one image in the plurality of images, and each measurement set comprises at least one of IMU measurements and available wireless measurements;
estimate a trajectory of the UE based, in part, on the plurality of images and the corresponding plurality of measurement sets;
send the estimated trajectory, plurality of images and corresponding plurality of measurement sets to a server wirelessly coupled to the UE; and
receive, based on the estimated trajectory, plurality of images and corresponding plurality of measurement sets, an indoor map of the structure from the server, wherein the indoor map is registered to absolute coordinates and comprises information pertaining to a corrected trajectory of the UE.

12. The UE of claim 11, wherein, to estimate the trajectory of the UE, the processor is configured to:
obtain a position of the UE in absolute coordinates in a vicinity of the structure; and
estimate the trajectory of the UE based, in part, on the position of the UE obtained in absolute coordinates.

13. The UE of claim 12, wherein, to estimate the trajectory of the UE, the processor is configured to:
apply Visual Simultaneous Localization and Mapping (VSLAM) techniques to a subset of the plurality of images to determine a corresponding 6 Degrees Of Freedom (6DOF) pose of the UE relative to each image in the subset, the 6DOF pose being determined based on keypoints in the subset of images; and
determine, for each image in the subset, a corresponding pose of the UE in absolute coordinates, based in part, on the corresponding 6DOF pose, and a corresponding measurement set.

14. The UE of claim 13, wherein to determine a pose of the UE in absolute coordinates corresponding to each image in the subset, the processor is configured to:
provide, for each image in the subset, the corresponding 6DOF pose and the corresponding measurement set to an Extended Kalman Filter (EKF), wherein the EKF determines the corresponding pose of the UE in absolute coordinates.

15. The UE of claim 11, wherein each measurement set further comprises one or more of:
barometric measurements; or
altimeter measurements; or
magnetometer measurements.

16. The UE of claim 15, wherein the indoor map includes a plurality of layers aligned to the absolute coordinates.

17. The UE of claim 16, wherein the plurality of aligned layers includes at least two of:
a plan view map, or
a 3-dimensional structure model, or
annotations for any variations to barometric pressure not predicted by a standard adiabatic lapse rate model, or
annotations for any magnetic field variations not predicted by a standard Earth magnetic field model, or
attenuation or delay of WWAN signals associated with the structure, or
annotations for any variation in WWAN signal strength within the structure, or
attenuation or delay of WLAN signals associated with the structure, or
an indication of WLAN AP locations within the structure, or
an indication of WLAN field strengths within the structure, or
an indication of WLAN RTT delay calibrations within the structure.

18. The UE of claim 11, wherein the available wireless measurements comprise one or more of:
Wireless Wide Area Network (WWAN) measurements comprising one of:
Observed Time Difference of Arrival (OTDOA) measurements, or
Reference Signal Time Difference (RSTD) measurements, or
Advanced Forward Link Trilateralation (AFLT) measurements, or
hybrid-AFLT measurements; or Wireless Local Area Network (WLAN) measurements comprising Radio Frequency (RF) measurements of Access Points (APs) signals.

19. The UE of claim 11, wherein the corrected trajectory of the UE corresponds to a closed-loop trajectory of the UE.

20. The UE of claim 11, wherein the processor is configured to: provide user-instructions to capture the plurality of images.

21. A User Equipment (UE) comprising:
- imaging means, the imaging means configured to capture a plurality of images of an interior of a structure when traversing a plurality of locations within the structure;
- sensing means, the sensing means comprising an Inertial Measurement Unit (IMU) means;
- wireless measurement means, the wireless measurement means configured to take measurements of available wireless signals;
- means for obtaining the plurality of images of the interior of the structure;
- means for obtaining a plurality of measurement sets, wherein each measurement set corresponds to at least one image in the plurality of images, and each measurement set comprises at least one of IMU measurements and available wireless measurements;
- means for estimating a trajectory of the UE based, in part, on the plurality of images and the plurality of measurement sets;
- means for sending the estimated trajectory, plurality of images and corresponding plurality of measurement sets to a server wirelessly coupled to the UE; and
- means for receiving, based on the estimated trajectory, plurality of images and corresponding plurality of measurement sets, an indoor map of the structure from the server, wherein the indoor map is registered to absolute coordinates and comprises information pertaining to a corrected trajectory of the UE.

22. The UE of claim 21, wherein means for estimating the trajectory of the UE comprises:
- means for obtaining a position of the UE in absolute coordinates in a vicinity of the structure, and wherein the means for estimating the trajectory of the UE estimates the trajectory of the UE based, in part, on the position of the UE obtained in absolute coordinates.

23. The UE of claim 22, wherein, means for estimating the trajectory of the UE comprises:
- means for applying Visual Simultaneous Localization and Mapping (VSLAM) techniques to a subset of the plurality of images to determine a corresponding 6 Degrees Of Freedom (6DOF) pose of the UE relative to each image in the subset, the 6DOF pose being determined based on keypoints in the subset of images; and
- means for determining, for each image in the subset, a corresponding pose of the UE in absolute coordinates, based in part, on the corresponding 6DOF pose, and a corresponding measurement set.

24. The UE of claim 23, wherein means for determining a pose of the UE in absolute coordinates corresponding to each image in the subset, comprises:
- means for providing, for each image in the subset, the corresponding 6DOF pose and the corresponding measurement set to an Extended Kalman Filter (EKF) means, wherein the EKF means determines the corresponding pose of the UE in absolute coordinates.

25. The UE of claim 21, wherein each measurement set further comprises one or more of:
- barometric measurements; or
- altimeter measurements; or
- magnetometer measurements.

26. A non-transitory computer-readable medium comprising instructions, which, when executed by a processor coupled to a User Equipment (UE), cause the processor to be configured to:
- capture a plurality of images of an interior of a structure when traversing a plurality of locations within the structure;
- capture a plurality of measurement sets, wherein each measurement set corresponds to at least one image, and each measurement set comprises at least one of Inertial Measurement Unit (IMU) measurements or available wireless measurements;
- estimate a trajectory of the UE based, in part, on the plurality of images and the plurality of measurement sets;
- send the estimated trajectory, plurality of images and corresponding plurality of measurement sets to a server wirelessly coupled to the UE; and
- receive, based on the estimated trajectory, plurality of images and corresponding plurality of measurement sets, an indoor map of the structure from the server, wherein the indoor map is registered to absolute coordinates and comprises information pertaining to a corrected trajectory of the UE.

27. The computer-readable medium of claim 26, wherein the instructions to estimate a trajectory of the UE cause the processor to:
- obtain a position of the UE in absolute coordinates in a vicinity of the structure; and
- estimate the trajectory based, in part, on the position of the UE obtained in absolute coordinates.

28. The computer-readable medium of claim 27, wherein the instructions to estimate a trajectory of the UE cause the processor to:
- apply Visual Simultaneous Localization and Mapping (VSLAM) techniques to a subset of the plurality of images to determine a corresponding 6 Degrees Of Freedom (6DOF) pose of the UE relative to each image in the subset, the 6DOF pose being determined based on keypoints in the subset of images; and
- determine, for each image in the subset, a corresponding pose of the UE in absolute coordinates, based in part, on the corresponding 6DOF pose, and a corresponding measurement set.

29. The computer-readable medium of claim 28, wherein the instructions to determine the corresponding pose of the UE in absolute coordinates cause the processor to:
- provide, for each image in the subset, the corresponding 6DOF pose and the corresponding measurement set to an Extended Kalman Filter (EKF), wherein the EKF determines the corresponding pose of the UE in absolute coordinates.

30. The computer-readable medium of claim 26, wherein each measurement set further comprises one or more of:
- barometric measurements; or
- altimeter measurements; or
- magnetometer measurements.

* * * * *